US011852603B2

(12) United States Patent
Sheu et al.

(10) Patent No.: US 11,852,603 B2
(45) Date of Patent: Dec. 26, 2023

(54) GAS SENSING METHOD AND GAS SENSING SYSTEM

(71) Applicant: National Yang Ming Chiao Tung University, Hsinchu (TW)

(72) Inventors: Jeng-Tzong Sheu, Hsinchu (TW); Hao-Hsuan Hsu, Taoyuan (TW); Chih-Wei Chen, Taichung (TW)

(73) Assignee: NATIONAL YANG MING CHIAO TUNG UNIVERSITY, Hsinchu (TW)

( * ) Notice: Subject to any disclaimer, the term of this patent is extended or adjusted under 35 U.S.C. 154(b) by 313 days.

(21) Appl. No.: 17/214,428

(22) Filed: Mar. 26, 2021

(65) Prior Publication Data

US 2022/0091061 A1  Mar. 24, 2022

(30) Foreign Application Priority Data

Sep. 18, 2020 (TW) ................. 109132370

(51) Int. Cl.
*G01N 27/12* (2006.01)
*G01N 27/22* (2006.01)
(52) U.S. Cl.
CPC ..... *G01N 27/129* (2013.01); *G01N 2027/222* (2013.01)
(58) Field of Classification Search
CPC .............. G01N 21/3504; G01N 27/12; G01N 27/4077; G01N 27/4071; G01N 27/407; G01N 21/39; G01N 27/419; G01N 27/4074; G01N 33/0009; G01N 27/127; G01N 33/004; G01N 33/0006; G01N 33/0037; G01N 27/125; G01N 27/4075; G01N 27/4067; G01N 27/16; G01N 33/0031;

(Continued)

(56) References Cited

U.S. PATENT DOCUMENTS 5,627,305 A * 5/1997 Yun ...................... G01N 27/122
73/31.06
6,774,613 B1 8/2004 Becker et al.
(Continued)

FOREIGN PATENT DOCUMENTS

JP 2009236907 A * 10/2009 ......... G01N 27/4143
JP 2010066009 A * 3/2010
(Continued)

OTHER PUBLICATIONS

Afridi et al., "A Monolithic CMOS Microhotplate-Based Gas Sensor System", IEEE Sensors Journal, Dec. 2002, vol. 2, No. 6, pp. 644-655.

(Continued)

*Primary Examiner* — Andre J Allen
(74) *Attorney, Agent, or Firm* — Birch, Stewart, Kolasch & Birch, LLP

(57) ABSTRACT

A gas sensing method and a gas sensing system are provided. The gas sensing method includes using a gas sensing device to sense a target gas, the gas sensing device having a self-heating region capable of producing a change in resistance in response to the target gas being sensed by the gas sensing device, and controlling a change in supply of current or voltage to the gas sensing device according to the change in resistance, so that the gas sensing device is substantially maintained operating at a predetermined temperature for sensing the target gas.

17 Claims, 11 Drawing Sheets

(58) Field of Classification Search
CPC ........... G01N 33/0047; G01N 27/4045; G01N 33/497; G01N 33/005; G01N 33/0036; G01N 27/409; G01N 21/783; G01N 21/1702; G01N 33/0027; G01N 30/02; G01N 33/0004; G01N 27/404; G01N 27/128; G01N 21/01; G01N 1/24; G01N 27/41; G01N 2021/1704; G01N 27/4175; G01N 21/31; G01N 27/4078; G01N 33/225; G01N 33/007; G01N 27/4141; G01N 27/4065; G01N 33/0016; G01N 2021/399; G01N 21/031; G01N 27/4073; G01N 27/417; G01N 15/0656; G01N 27/00; G01N 21/61; G01N 33/0054; G01N 29/036; G01N 33/0063; G01N 27/18; G01N 30/06; G01N 33/0062; G01N 29/024; G01N 2291/021; G01N 1/22; G01N 2030/025; G01N 21/274; G01N 27/4072; G01N 27/122; G01N 15/06; G01N 33/0011; G01N 21/314; G01N 27/416; G01N 2291/02809; G01N 21/05; G01N 27/126; G01N 29/022; G01N 1/2252; G01N 33/0044; G01N 25/18; G01N 2015/0046; G01N 21/33; G01N 27/4062; G01N 33/00; G01N 27/123; G01N 27/4163; G01N 33/0014; G01N 27/26; G01N 27/4162; G01N 21/0303; G01N 1/2205; G01N 21/85; G01N 33/0073; G01N 29/222; G01N 31/223; G01N 27/04; G01N 21/359; G01N 33/0013; G01N 2291/0256; G01N 1/2273; G01N 2291/02836; G01N 27/14; G01N 27/66; G01N 33/0032; G01N 27/30; G01N 2291/0215; G01N 2021/3513; G01N 21/15; G01N 27/4076; G01N 33/0042; G01N 21/3518; G01N 33/2841; G01N 27/124; G01N 27/62; G01N 2015/0693; G01N 2021/0112; G01N 7/14; G01N 1/2258; G01N 30/88; G01N 1/2247; G01N 15/0826; G01N 21/37; G01N 2201/06113; G01N 2021/1793; G01N 7/00; G01N 21/65; G01N 27/129; G01N 29/02; G01N 21/27; G01N 29/2425; G01N 27/622; G01N 27/121; G01N 29/032; G01N 27/4143; G01N 31/22; G01N 2291/014; G01N 2291/02881; G01N 2027/222; G01N 2021/8578; G01N 21/53; G01N 33/4972; G01N 21/59; G01N 27/74; G01N 2033/4975; G01N 21/255; G01N 1/2214; G01N 1/2226; G01N 1/34; G01N 2291/02818; G01N 2201/062; G01N 2201/0612; G01N 1/2202; G01N 27/301; G01N 33/0075; G01N 30/64; G01N 33/0022; G01N 27/70; G01N 2030/062; G01N 1/405; G01N 27/4146; G01N 30/68; G01N 15/0606; G01N 21/45; G01N 21/17; G01N 27/221; G01N 30/66; G01N 2201/0221; G01N 9/002; G01N 33/006; G01N 33/0067; G01N 21/643; G01N 27/626; G01N 7/10; G01N 21/0332; G01N 15/0618; G01N 33/0026; G01N 21/03; G01N 33/24; G01N 2291/02433; G01N 2201/0636; G01N 2291/102; G01N 2021/3595; G01N 33/2823; G01N 33/4925; G01N 31/12; G01N 5/02; G01N 31/224; G01N 29/326; G01N 21/7703; G01N 2021/391; G01N 27/227; G01N 15/08; G01N 25/32; G01N 29/2418; G01N 1/38; G01N 2021/3531; G01N 2291/0423; G01N 2291/0212; G01N 21/534; G01N 2021/7786; G01N 29/30; G01N 2021/151; G01N 2201/08; G01N 2001/2223; G01N 21/8507; G01N 30/72; G01N 33/0059; G01N 21/77; G01N 21/78; G01N 1/44; G01N 25/20; G01N 27/22; G01N 27/64; G01N 27/403; G01N 1/2294; G01N 33/0039; G01N 2291/0426; G01N 27/414; G01N 33/18; G01N 2291/02872; G01N 27/413; G01N 13/00; G01N 1/28; G01N 27/041; G01N 21/25; G01N 2033/0072; G01N 2291/0427; G01N 2021/1795; G01N 33/0018; G01N 21/3103; G01N 1/26; G01N 15/0205; G01N 21/6428; G01N 27/223; G01N 27/226; G01N 21/766; G01N 9/00; G01N 21/64; G01N 33/22; G01N 21/3151; G01N 25/68; G01N 33/0057; G01N 21/35; G01N 2001/2282; G01N 30/7206; G01N 2201/1211; G01N 27/02; G01N 27/304; G01N 2021/6432; G01N 22/00; G01N 25/22; G01N 2021/0314; G01N 27/185; G01N 33/0024; G01N 33/2025; G01N 2033/0068; G01N 2201/061; G01N 2291/0255; G01N 27/40; G01N 9/36; G01N 30/30; G01N 7/04; G01N 2001/2264; G01N 30/20; G01N 27/308; G01N 27/406; G01N 33/0029; G01N 15/00; G01N 2201/0691; G01N 21/41; G01N 27/06; G01N 29/14; G01N 33/0034; G01N 33/0065; G01N 21/8483; G01N 2201/0696; G01N 2291/011; G01N 30/74; G01N 21/67; G01N 31/10; G01N 2021/158; G01N 30/12; G01N 33/0008; G01N 2021/3166; G01N 21/80; G01N 1/40; G01N 21/00; G01N 33/02; G01N 29/348; G01N 33/0052; G01N 30/62; G01N 21/84; G01N 2001/2244; G01N 25/00; G01N 30/32; G01N 2201/1215; G01N 2021/1708; G01N 2021/0346; G01N 2291/101; G01N 25/30; G01N 30/08; G01N 2030/642; G01N 21/55; G01N 21/658; G01N 2001/2261; G01N 2013/003; G01N 2021/3129; G01N 21/3554; G01N 2201/068; G01N 29/46; G01N 21/09; G01N 2021/7773; G01N 33/28; G01N 21/645; G01N 27/49; G01N 2001/2229; G01N 25/36; G01N 5/00; G01N 15/02; G01N 30/16; G01N 27/4148; G01N 30/14; G01N 2030/884; G01N 30/00; G01N 7/16; G01N 2021/3181; G01N 31/005; G01N 25/56; G01N 21/552; G01N 2201/127; G01N 2291/015; G01N 15/088; G01N 27/48; G01N 27/27; G01N 9/24; G01N 21/47; G01N 21/3577; G01N 21/75; G01N 2291/048; G01N 21/94; G01N 27/60; G01N 31/00; G01N 2021/3137; G01N 27/045; G01N 15/065; G01N 21/1717;

G01N 2291/044; G01N 30/6095; G01N 21/72; G01N 2291/0217; G01N 24/081; G01N 2201/12; G01N 2021/052; G01N 2291/02863; G01N 2001/225; G01N 2021/3133; G01N 15/1459; G01N 2291/012; G01N 29/22; G01N 1/14; G01N 2291/02845; G01N 21/11; G01N 21/171; G01N 21/76; G01N 21/553; G01N 27/046; G01N 15/082; G01N 2001/2276; G01N 27/225; G01N 2201/1218; G01N 27/68; G01N 15/0806; G01N 2021/3545; G01N 2021/396; G01N 2021/8557; G01N 2201/129; G01N 30/461; G01N 30/70; G01N 3/12; G01N 5/04; G01N 2021/458; G01N 29/2462; G01N 30/78; G01N 33/241; G01N 15/0211; G01N 2030/8854; G01N 1/10; G01N 21/554; G01N 29/4427; G01N 2021/317; G01N 2021/354; G01N 2030/047; G01N 21/3581; G01N 25/28; G01N 27/307; G01N 29/323; G01N 33/222; G01N 2021/3536; G01N 33/146; G01N 30/8675; G01N 31/221; G01N 33/0045; G01N 2001/4016; G01N 21/51; G01N 2291/02854; G01N 29/4436; G01N 2021/0378; G01N 21/21; G01N 27/624; G01N 29/2437; G01N 2001/2255; G01N 2021/7783; G01N 27/3278; G01N 27/333; G01N 2291/106; G01N 29/32; G01N 9/266; G01N 2015/086; G01N 21/6402; G01N 25/005; G01N 33/0049; G01N 15/0893; G01N 2291/0257; G01N 30/54; G01N 17/00; G01N 2021/8416; G01N 2030/324; G01N 21/71; G01N 27/228; G01N 29/223; G01N 2201/0214; G01N 27/07; G01N 33/14; G01N 2001/2285; G01N 2021/3155; G01N 2021/772; G01N 2201/024; G01N 2015/1486; G01N 2030/121; G01N 25/4873; G01N 29/04; G01N 2021/8405; G01N 21/68; G01N 2201/0627; G01N 27/28; G01N 33/227; G01N 2015/084; G01N 2021/0389; G01N 21/532; G01N 21/63; G01N 21/90; G01N 2291/0422; G01N 27/028; G01N 11/00; G01N 25/66; G01N 25/72; G01N 29/07; G01N 2030/201; G01N 21/276; G01N 21/49; G01N 2201/023; G01N 27/002; G01N 30/34; G01N 1/4005; G01N 2291/045; G01N 29/36; G01N 15/0266; G01N 29/00; G01N 25/54; G01N 25/14; G01N 2201/0668; G01N 2201/084; G01N 33/0021; G01N 9/32; G01N 1/286; G01N 1/42; G01N 13/02; G01N 2009/006; G01N 2021/773; G01N 27/026; G01N 27/423; G01N 33/205; G01N 2001/227; G01N 21/69; G01N 2203/0019; G01N 30/8634; G01N 2030/067; G01N 21/6408; G01N 9/26; G01N 2033/0019; G01N 2201/066; G01N 2291/0289; G01N 29/228; G01N 33/1806; G01N 1/00; G01N 21/5907; G01N 27/048; G01N 2021/0193; G01N 2030/126; G01N 2201/0231; G01N 27/4035; G01N 2001/247; G01N 31/225; G01N 2201/0638; G01N 29/34; G01N 33/0055; G01N 33/025; G01N 2001/022; G01N 21/278; G01N 2201/06186; G01N 2291/105; G01N 2001/245; G01N 2021/7763; G01N 2201/0621; G01N 29/265; G01N 30/84; G01N 30/8679; G01N 33/2888; G01N 7/18; G01N 33/48; G01N 1/02; G01N 2021/0385; G01N 2021/394; G01N 21/774; G01N 2001/021; G01N 2030/125; G01N 2201/025; G01N 33/442; G01N 33/98; G01N 2021/7759; G01N 11/16; G01N 2021/3148; G01N 2030/8886; G01N 33/1826; G01N 2030/0095; G01N 2201/067; G01N 29/48; G01N 3/02; G01N 17/04; G01N 2001/2241; G01N 2033/4977; G01N 21/73; G01N 21/954; G01N 29/28; G01N 2015/1493; G01N 22/04; G01N 2201/128; G01N 27/3271; G01N 29/4463; G01N 1/08; G01N 1/2211; G01N 15/10; G01N 2021/058; G01N 2021/3174; G01N 2021/451; G01N 30/466; G01N 2021/651; G01N 2021/8411; G01N 2030/045; G01N 2030/085; G01N 2030/645; G01N 2291/2636; G01N 31/16; G01N 2021/0106; G01N 27/043; G01N 30/40; G01N 30/8658; G01N 33/84; G01N 1/4044; G01N 2021/8585; G01N 2030/8804; G01N 2030/8881; G01N 2201/0637; G01N 2201/0686; G01N 2291/2634; G01N 25/48; G01N 29/42; G01N 29/44; G01N 1/4022; G01N 1/4077; G01N 2021/3177; G01N 2021/6434; G01N 21/4133; G01N 21/88; G01N 2201/0633; G01N 2201/088; G01N 30/96; G01N 33/1846; G01N 33/2847; G01N 15/0272; G01N 2021/7776; G01N 2030/3061; G01N 2030/8809; G01N 29/11; G01N 29/38; G01N 1/2208; G01N 2021/775; G01N 2201/0697; G01N 2201/12753; G01N 30/04; G01N 30/10; G01N 2021/3125; G01N 2021/4709; G01N 2201/0662; G01N 27/021; G01N 27/401; G01N 29/12; G01N 17/02; G01N 2021/0382; G01N 2021/3107; G01N 2021/7709; G01N 2030/123; G01N 21/66; G01N 33/50; G01N 11/08; G01N 13/04; G01N 2030/128; G01N 21/718; G01N 30/60; G01N 33/0001; G01N 2001/4033; G01N 2021/157; G01N 2201/022; G01N 29/343; G01N 2001/2232; G01N 2001/4088; G01N 2021/3185; G01N 27/205; G01N 29/4418; G01N 2001/2267; G01N 2021/0118; G01N 21/3563; G01N 2201/121; G01N 2291/02408; G01N 23/04; G01N 27/4161; G01N 29/4472; G01N 3/08; G01N 30/24; G01N 30/86; G01N 2001/105; G01N 2001/242; G01N 2001/4066; G01N 2015/0011; G01N 2201/105; G01N 27/902; G01N 29/2406; G01N 30/26; G01N 30/468; G01N 7/02; G01N 19/10; G01N 2015/0866; G01N 21/7746; G01N 21/8806; G01N 23/12;

G01N 30/6078; G01N 15/1404; G01N 2001/2288; G01N 2021/536; G01N 21/6486; G01N 25/142; G01N 33/0098; G01N 1/2035; G01N 17/006; G01N 2015/0026; G01N 2030/3007; G01N 21/6404; G01N 21/81; G01N 2201/0698; G01N 2201/12761; G01N 2203/0048; G01N 27/4118; G01N 33/12; G01N 2021/8521; G01N 2030/3076; G01N 2030/3084; G01N 21/62; G01N 21/6489; G01N 27/31; G01N 29/24; G01N 33/2835; G01N 35/00871; G01N 2001/2217; G01N 2030/143; G01N 21/251; G01N 27/4166; G01N 27/72; G01N 30/8665; G01N 15/0255; G01N 2030/626; G01N 2201/0233; G01N 2201/126; G01N 15/0625; G01N 2001/2291; G01N 2021/0307; G01N 2021/1765; G01N 2021/6417; G01N 2201/0625; G01N 2201/0873; G01N 25/50; G01N 25/64; G01N 27/286; G01N 27/3335; G01N 27/4114; G01N 15/1434; G01N 2021/0364; G01N 2021/1748; G01N 2021/392; G01N 2021/6439; G01N 2291/022; G01N 2291/103; G01N 27/82; G01N 29/40; G01N 30/18; G01N 33/383; G01N 2001/028; G01N 2021/178; G01N 2030/027; G01N 2030/065; G01N 2201/0216; G01N 27/83; G01N 29/028; G01N 29/2431; G01N 35/00; G01N 15/1031; G01N 2015/1075; G01N 2021/0396; G01N 21/3586; G01N 2201/0634; G01N 2201/0826; G01N 2201/12723; G01N 2201/12784; G01N 2203/0044; G01N 2291/0258; G01N 25/4893; G01N 27/623; G01N 2001/2893; G01N 2021/258; G01N 2021/7793; G01N 2030/042; G01N 2291/023; G01N 27/283; G01N 27/4165; G01N 33/1886; G01N 2001/002; G01N 2021/1723; G01N 2021/1797; G01N 2030/383; G01N 2201/0624; G01N 2201/12792; G01N 27/302; G01N 27/3277; G01N 29/4454; G01N 33/2882; G01N 35/08; G01N 35/1097; G01N 9/04; G01N 2009/004; G01N 2015/0003; G01N 2021/7779; G01N 2030/8813; G01N 21/431; G01N 21/91; G01N 2201/0806; G01N 2201/12746; G01N 2291/0224; G01N 2291/02425; G01N 24/08; G01N 24/082; G01N 29/449; G01N 2001/2238; G01N 2015/0662; G01N 2021/036; G01N 2030/146; G01N 2030/965; G01N 2033/0081; G01N 21/8851; G01N 2201/0228; G01N 25/46; G01N 25/62; G01N 27/4111; G01N 29/4481; G01N 30/28; G01N 33/49; G01N 15/0227; G01N 2015/0065; G01N 2021/7723; G01N 2030/8405; G01N 2033/0095; G01N 2035/1018; G01N 27/38; G01N 27/9046; G01N 29/2481; G01N 19/04; G01N 2001/2235; G01N 21/716; G01N 2201/0693; G01N 23/2251; G01N 27/327; G01N 27/4167; G01N 2800/042; G01N 30/6043; G01N 33/15; G01N 2021/054; G01N 2030/3053; G01N 2223/508; G01N 33/54373; G01N 2015/1062; G01N 2021/335; G01N 2201/0616; G01N 2201/0635; G01N 2291/02416; G01N 23/046; G01N 25/58; G01N 27/42; G01N 30/8624; G01N 2001/2279; G01N 2001/383; G01N 2021/177; G01N 2021/3159; G01N 2021/3196; G01N 2030/402; G01N 5/045; G01N 2001/248; G01N 2013/0266; G01N 2015/0681; G01N 2015/1006; G01N 2021/3188; G01N 2201/0833; G01N 2203/0676; G01N 2291/024; G01N 2291/2693; G01N 2496/70; G01N 25/02; G01N 27/4168; G01N 27/92; G01N 29/225; G01N 30/6052; G01N 30/8631; G01N 35/00584; G01N 1/04; G01N 1/20; G01N 11/04; G01N 2015/0053; G01N 2015/0294; G01N 2015/0846; G01N 2035/00881; G01N 21/474; G01N 2201/0631; G01N 2201/0694; G01N 2201/12715; G01N 2223/638; G01N 30/38; G01N 30/76; G01N 33/143; G01N 33/2829; G01N 19/00; G01N 2001/1031; G01N 2001/2826; G01N 2021/1714; G01N 2021/1725; G01N 2021/3509; G01N 2021/7796; G01N 2030/008; G01N 2030/3015; G01N 2030/8859; G01N 2030/8872; G01N 21/293; G01N 2201/0236; G01N 2201/10; G01N 23/20; G01N 25/385; G01N 30/8693; G01N 33/2852; G01N 33/343; G01N 15/14; G01N 2021/3144; G01N 2021/6484; G01N 2030/3046; G01N 21/648; G01N 21/8422; G01N 2201/1214; G01N 23/00; G01N 29/341; G01N 29/50; G01N 37/00; G01N 15/1436; G01N 2015/0038; G01N 2021/1734; G01N 2030/207; G01N 21/29; G01N 21/631; G01N 21/9081; G01N 2201/064; G01N 2291/0421; G01N 23/02; G01N 25/4846; G01N 27/44; G01N 29/2412; G01N 33/182; G01N 35/10; G01N 1/125; G01N 2015/0813; G01N 2021/1787; G01N 2021/8466; G01N 2021/8514; G01N 2030/326; G01N 23/22; G01N 25/482; G01N 27/9006; G01N 2800/085; G01N 29/221; G01N 3/567; G01N 30/463; G01N 30/95; G01N 33/5308; G01N 1/1409; G01N 1/4055; G01N 2021/152; G01N 2021/755; G01N 2021/7756; G01N 2030/009; G01N 2030/3038; G01N 2030/685; G01N 2030/746; G01N 21/43; G01N 2201/0846; G01N 2291/02827; G01N 24/10; G01N 25/4826; G01N 27/025; G01N 27/24; G01N 29/2468; G01N 30/8606; G01N 33/30; G01N 33/558; G01N 33/94; G01N 9/02; G01N 2001/2297; G01N 2015/0096; G01N 2030/122; G01N 21/4738; G01N 2201/063; G01N 2203/0003; G01N 2291/02466; G01N 25/60; G01N 27/10; G01N 29/346; G01N 33/521; G01N 33/54386; G01N 33/96; G01N 11/02;

G01N 11/14; G01N 2001/1062; G01N 2001/386; G01N 2001/4027; G01N 2013/0208; G01N 2021/1751; G01N 2021/8887; G01N 2030/167; G01N 2201/0227; G01N 2201/1247; G01N 2203/0682; G01N 23/223; G01N 27/20; G01N 27/76; G01N 31/222; G01N 33/246; G01N 15/1429; G01N 2015/0261; G01N 2021/0325; G01N 2021/3527; G01N 2021/8427; G01N 2030/3069; G01N 21/211; G01N 21/412; G01N 21/538; G01N 21/74; G01N 2201/065; G01N 23/2273; G01N 33/1893; G01N 33/20; G01N 33/54366; G01N 35/1095; G01N 2013/0241; G01N 2021/1742; G01N 2030/647; G01N 2035/009; G01N 22/02; G01N 2201/02; G01N 2201/101; G01N 2201/1286; G01N 2201/1293; G01N 2203/0075; G01N 2203/0256; G01N 23/06; G01N 29/2443; G01N 29/4409; G01N 3/36; G01N 3/56; G01N 33/492; G01N 9/20; G01N 2015/0019; G01N 2021/1712; G01N 2021/6471; G01N 2021/6482; G01N 2030/185; G01N 2030/8435; G01N 2223/1013; G01N 25/12; G01N 27/08; G01N 3/04; G01N 30/465; G01N 30/7253; G01N 30/8651; G01N 31/229; G01N 33/26; G01N 35/00693; G01N 2001/024; G01N 2001/1025; G01N 2015/0277; G01N 2021/1772; G01N 2021/4728; G01N 2021/7789; G01N 2030/625; G01N 21/253; G01N 21/958; G01N 2201/06146; G01N 2201/082; G01N 2201/1296; G01N 2201/13; G01N 2291/0226; G01N 2291/2695; G01N 25/4813; G01N 25/70; G01N 27/36; G01N 27/90; G01N 29/041; G01N 29/045; G01N 3/06; G01N 33/1833; G01N 33/5438; G01N 7/06; G01N 11/06; G01N 17/043; G01N 2009/028; G01N 2013/025; G01N 2015/0873; G01N 2021/155; G01N 2021/1706; G01N 2021/1736; G01N 2021/3522; G01N 2021/395; G01N 2021/7753; G01N 2030/202; G01N 2035/00217; G01N 21/82; G01N 21/9027; G01N 2201/1245; G01N 2203/0641; G01N 2223/07; G01N 27/305; G01N 27/4115; G01N 29/2487; G01N 30/6039; G01N 33/1813; G01N 33/44; G01N 33/6893; G01N 7/12; G01N 2001/381; G01N 2015/0015; G01N 2021/1727; G01N 2021/434; G01N 2021/6469; G01N 21/0317; G01N 21/4785; G01N 21/9515; G01N 2201/1241; G01N 2203/0226; G01N 2223/03; G01N 2291/2697; G01N 23/083; G01N 23/20091; G01N 2610/00; G01N 27/023; G01N 27/411; G01N 29/043; G01N 29/046; G01N 3/10; G01N 30/8603; G01N 33/287; G01N 33/4915; G01N 33/493; G01N 33/525; G01N 35/00722; G01N 2001/205; G01N 2015/0238; G01N 2015/105; G01N 2021/655; G01N 2021/8645; G01N 2021/945; G01N 2030/623; G01N 2030/8868; G01N 2035/00455; G01N 21/272; G01N 21/4788; G01N 21/4795; G01N 21/9501; G01N 2201/021; G01N 2201/0622; G01N 2203/0658; G01N 2223/076; G01N 2223/616; G01N 2291/017; G01N 2291/056; G01N 23/18; G01N 23/207; G01N 27/4145; G01N 30/48; G01N 33/2858; G01N 33/46; G01N 33/483; G01N 33/5014; G01N 33/53; G01N 35/1016; G01N 7/20; G01N 17/046; G01N 2001/4061; G01N 2011/0093; G01N 2015/0007; G01N 2021/0162; G01N 2021/0321; G01N 2021/0392; G01N 2021/056; G01N 2021/397; G01N 2021/4166; G01N 2021/4757; G01N 2021/4769; G01N 2021/4792; G01N 2021/5957; G01N 2021/7726; G01N 2030/127; G01N 2033/245; G01N 21/455; G01N 21/93; G01N 2201/1248; G01N 2201/1285; G01N 2203/0005; G01N 2203/0017; G01N 2203/0073; G01N 2223/635; G01N 23/095; G01N 23/222; G01N 25/42; G01N 27/628; G01N 30/7213; G01N 30/7293; G01N 30/92; G01N 33/52; G01N 35/00029; G01N 35/1009; G01N 9/16; G01N 9/30; G01N 15/0637; G01N 15/1056; G01N 15/1463; G01N 19/02; G01N 2001/241; G01N 2001/244; G01N 2001/388; G01N 2015/149; G01N 2021/1731; G01N 2021/5969; G01N 2021/7713; G01N 2030/8423; G01N 21/256; G01N 21/95; G01N 2201/0623; G01N 2201/0632; G01N 2203/0282; G01N 2291/0222; G01N 2333/245; G01N 25/26; G01N 29/227; G01N 3/307; G01N 30/7266; G01N 30/8637; G01N 30/8686; G01N 33/4836; G01N 33/48707; G01N 33/542; G01N 33/553; G01N 15/04; G01N 2001/2833; G01N 2015/1087; G01N 2021/0357; G01N 2021/213; G01N 2021/4711; G01N 2021/4726; G01N 2021/4742; G01N 2021/513; G01N 2021/758; G01N 2030/6013; G01N 2033/0003; G01N 2035/00346; G01N 21/23; G01N 21/636; G01N 21/8803; G01N 2201/06; G01N 2201/125; G01N 2203/0091; G01N 2223/0745; G01N 2223/1016; G01N 2223/63; G01N 27/3272; G01N 29/0654; G01N 29/26; G01N 3/068; G01N 3/18; G01N 3/24; G01N 3/313; G01N 30/6034; G01N 31/164; G01N 33/03; G01N 33/491; G01N 33/58; G01N 33/64; G01N 35/04; G01N 5/025; G01N 7/08; G01N 1/30; G01N 15/0612; G01N 2001/007; G01N 2001/387; G01N 2015/144; G01N 2021/0131; G01N 2021/0187; G01N 2021/174; G01N 2021/398; G01N 2021/6419; G01N 2030/205; G01N 21/79; G01N 21/89; G01N 21/9018; G01N 21/952; G01N 2201/0224; G01N 2201/06173; G01N 2201/0683; G01N 2201/069; G01N 2201/086; G01N

2203/0046; G01N 2203/0066; G01N 2203/0067; G01N 2203/023; G01N 2203/0274; G01N 2291/018; G01N 2291/0235; G01N 25/04; G01N 25/44; G01N 27/904; G01N 29/069; G01N 29/262; G01N 3/60; G01N 30/7233; G01N 30/7273; G01N 33/34; G01N 33/54346; G01N 35/00603; G01N 35/00712; G01N 35/1079; G01N 9/08

See application file for complete search history.

(56) References Cited

U.S. PATENT DOCUMENTS

| | | |
|---|---|---|
| 9,279,782 B2 | 3/2016 | Chou et al. |
| 2007/0242549 A1 | 10/2007 | Klostermann et al. |
| 2009/0084158 A1* | 4/2009 | Bristol .............. G01N 27/122 73/25.03 |
| 2014/0053631 A1* | 2/2014 | Watanabe .............. G01N 25/18 73/30.01 |
| 2020/0051834 A1 | 2/2020 | Chandrasekharan et al. |

FOREIGN PATENT DOCUMENTS

| | | |
|---|---|---|
| JP | 5115411 B2 * | 1/2013 |
| TW | 201413241 A | 4/2014 |
| TW | 202027192 A | 7/2020 |

OTHER PUBLICATIONS

Endres et al., "A test system for gas sensors", Sensors and Actuators B, 1995, vol. 23, pp. 163-172.

Hong et al., "Highly selective ZnO gas sensor based on MOSFET having a horizontal floating-gate", Sensors and Actuators B: Chemical, 2016, vol. 232, pp. 653-659.

Hübert et al., "Hydrogen sensors—A review", Sensors and Actuators B: Chemical, 2011, vol. 157, pp. 329-352.

* cited by examiner

1000

S10
using a gas sensing device to sense a target gas, the gas sensing device having a self-heating region capable of producing a change in resistance in response to the target gas being sensed by the gas sensing device

S12
controlling a change in supply of current or voltage to the gas sensing device according to the change in resistance, so that the gas sensing device is substantially maintained operating at a predetermined temperature for sensing the target gas

S14
obtaining a resistance of the self-heating region

S16
determining a change in power corresponding to the change in resistance according to the resistance, and controlling the change in supply of current or voltage to the gas sensing device according to the change in power, so that the gas sensing device is substantially operated at a constant power

FIG. 1

GAS SENSING METHOD AND GAS SENSING SYSTEM

BACKGROUND OF THE INVENTION

1. Field of the Invention

The invention generally relates to a gas sensing method and a gas sensing system. Particularly, the invention relates to a gas sensing method and a gas sensing system capable of enabling the gas sensing device to be operated at a predetermined temperature during sensing.

2. Description of the Prior Art

Recently, semiconductor gas sensors have attracted much attention due to their advantages of fast response, low cost, small size, and low power consumption. However, the sensing temperature of the sensing material of the semiconductor gas sensor highly influences the signal response. In order to obtain a good signal response, the gas sensor should be operated at a temperature specific for the target gas. Conventional gas sensor is provided with an external heater to maintain the temperature of the gas sensor. The external heater will increase the overall power consumption (>25 mW/device) of the gas sensor, so the gas sensor is infeasible to be implemented to the wearable devices. In addition, using the external heater is likely to cause variation in temperature, so the gas sensor cannot be stably operated at the desired temperature.

Since the self-heating gas sensor has a self-heating region, which can produce a self-heating effect during operation without using an additional external heater, the self-heating gas sensor is not only relatively simple in structure but also effective in reducing power consumption during sensing, and gradually becomes one of the mainstream of developing the semiconductor gas sensors. However, since the self-heating temperature of the self-heating gas sensor itself will change due to the change of its own resistance, the measured signal includes not only the gas response but also the temperature response, which is not conducive to quantification of the gas concentration. In addition, the sensing material generally has a better sensing temperature specific for the target gas, so the gas sensor must be operated at such a specific temperature for a better result. However, the temperature of the self-heating gas sensor during measurement will change with the change of gas concentration, so that the gas sensor cannot be maintained operating at the specific temperature, which significantly affects the sensing result.

SUMMARY OF THE INVENTION

It is an object of the invention to provide a gas sensing method and a gas sensing system, which utilizes feedback control to make the gas sensing device be substantially maintained operating at a predetermined sensing temperature to promote the sensing effect.

It is another object of the invention to provide a gas sensing method and a gas sensing system, which utilizes feedback control to make the gas sensing device be operated in a constant power mode, so the signal response is substantially positively correlated with the gas concentration only, and the signal of the gas sensing device has a better linearity to the change of different gas concentrations, so that the gas sensing system can be easier commercialized.

In an embodiment, the invention provides a gas sensing method including: using a gas sensing device to sense a target gas, the gas sensing device including a self-heating region capable of producing a change in resistance in response to the target gas being sensed by the gas sensing device, and controlling a change in supply of current or voltage to the gas sensing device according to the change in resistance, so that the gas sensing device is substantially maintained operating at a predetermined temperature for sensing the target gas.

In an embodiment, the step of controlling the change in supply of current or voltage includes: obtaining a resistance of the self-heating region, determining a change in power corresponding to the change in resistance according to the resistance, and controlling the change in supply of current or voltage to the gas sensing device according to the change in power, so that the gas sensing device is substantially operated at a constant power.

In an embodiment, the step of controlling the change in supply of current or voltage includes: controlling the change in supply of current or voltage according to a time stamp, wherein when the time stamp is negative, obtaining a resistance of the self-heating region, determining a change in power corresponding to the change in resistance according to the resistance, and controlling the change in supply of current or voltage to the gas sensing device according to the change in power, so that the gas sensing device is substantially operated at a constant power; when the time stamp is positive, supplying a low voltage to the gas sensing device, and obtaining the resistance of the self-heating region as a sensing resistance when the gas sensing device is operated at the low voltage.

In an embodiment, the step of obtaining the resistance of the self-heating region includes: measuring current flowing through the self-heating region, and calculating the resistance based on the voltage supplied to the gas sensing device, or measuring voltage between two ends of the self-heating region, and calculating the resistance based on the current supplied to the gas sensing device.

In an embodiment, the step of determining the change in power includes: comparing a power corresponding to the resistance with a predetermined power corresponding to the predetermined temperature to calculate the change in power.

In an embodiment, the step of controlling the change in supply of current or voltage includes: controlling the voltage supplied to the gas sensing device by a pulse width modulation or an alternating current.

In an embodiment, the gas sensing device includes a sensing material formed on the self-heating region, and the predetermined temperature is determined based on the target gas and the sensing material.

In an embodiment, the change in resistance causes a change in temperature of the self-heating region, and the step of controlling the change in supply of current or voltage includes: controlling the change in supply of current or voltage to the gas sensing device to compensate for the change in temperature of the self-heating region.

In another embodiment, the invention provides a gas sensing system including a gas sensing device having a self-heating region capable of producing a change in resistance in response to a target gas being sensed by the gas sensing device, and a control unit configured to control a change in supply of current or voltage to the gas sensing device according to the change in resistance, so that the gas sensing device is substantially maintained operating at a predetermined temperature for sensing the target gas.

In an embodiment, the control unit includes a power source, a measuring unit, and a feedback unit; the power source is configured to supply current or voltage to the gas sensing device; the measuring unit is configured to obtain a resistance of the self-heating region; the feedback unit is configured to determine a change in power corresponding to the change in resistance according to the resistance, and the power source changes the supply of current or voltage to the gas sensing device according to the change in power, so that the gas sensing device is substantially operated at a constant power for sensing the target gas.

In an embodiment, the control unit controls the change in supply of current or voltage according to a time stamp, wherein when the time stamp is negative, the feedback unit determines the change in power corresponding to the change in resistance according to the resistance, and the power source changes the supply of current or voltage to the gas sensing device according to the change in power, so that the gas sensing device is substantially operated at the constant power for sensing the target gas, and when the time stamp is positive, the power source supplies a low voltage to the gas sensing device, and the measuring unit is configured to obtain the resistance of the self-heating region as a sensing resistance when the gas sensing device is operated at the low voltage.

In an embodiment, the measuring unit measures current flowing through the self-heating region, and the resistance is calculated based on the voltage supplied to the gas sensing device.

In an embodiment, the measuring unit measures voltage between two ends of the self-heating region, and the resistance is calculated based on the current supplied to the gas sensing device.

In an embodiment, the feedback unit compares a power corresponding to the resistance with a predetermined power corresponding to the predetermined temperature to calculate the change in power.

In an embodiment, the change in resistance causes a change in temperature of the self-heating region, and the control unit controls the change in supply of current or voltage to the gas sensing device to compensate for the change in temperature of the self-heating region.

In an embodiment, the power source to supplies the voltage to the gas sensing device by a pulse width modulation or an alternating current.

Compared to the conventional techniques, through feedback control, the gas sensing method and the gas sensing system of the invention can keep the gas sensing device operating in a better sensing temperature range specific for the target gas, so as to obtain a better sensing response. Furthermore, the gas sensing method and the gas sensing system of the invention control the current or voltage supplied to the gas sensing device to compensate for the change in temperature of the self-heating region, so as to improve the sensing effect and improve the accuracy of the measurement signal.

BRIEF DESCRIPTION OF THE DRAWINGS

FIG. 1 is a flowchart of an embodiment of the gas sensing method of the invention;

DETAILED DESCRIPTION OF THE PREFERRED EMBODIMENT

FIG. 1 is a flowchart of an embodiment of the gas sensing method of the invention. The gas sensing method 1000 includes: step S10, using a gas sensing device to sense a target gas, the gas sensing device having a self-heating region capable of producing a change in resistance in response to the target gas being sensed by the gas sensing device, and step S12, controlling a change in supply of current or voltage to the gas sensing device according to the change in resistance, so that the gas sensing device is substantially maintained operating at a predetermined temperature for sensing the target gas.

Figure 2:
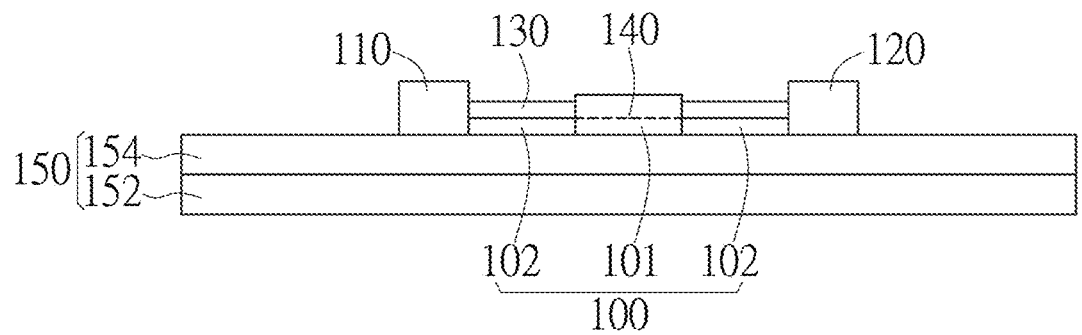
FIG. 2 is a schematic view of an embodiment of the gas sensing device used in the gas sensing method of the invention.

Specifically, the gas sensing method of the invention is preferably applied to the gas sensing of a semiconductor gas sensing device, such as the gas sensing of a self-heating gas sensing device, but not limited thereto. Referring to FIG. 2, FIG. 2 is a schematic view of an embodiment of the gas sensing device used in the gas sensing method of the invention. As shown in FIG. 2, the gas sensing device 10A is preferably a nanodevice and can be formed on a substrate 150. The substrate 150 can be a semiconductor substrate 152 with an insulation layer 154 formed thereon, such as a silicon substrate with oxide formed thereon, but not limited thereto. The gas sensing device 10A can include a source 110, a drain 120, a device channel 100, a dielectric layer 130, and a sensing material 140. In an embodiment, the device channel 100 can include any semiconductor materials as appropriate, and the device channel 100 can be formed as a nanobelt or a nanowire. Two ends of the device channel 100 are electrically connected to the source 110 and the drain 120, respectively. The device channel 100 includes a self-heating region 101, and the self-heating region 101 can be a lightly-doped region. The device channel 100 can further include two heavily-doped regions 102, which are disposed at two ends of the lightly-doped region (e.g. 101) and adjoin the source 110 and the drain 120, respectively. According to practical applications, the doped region can be an n-doped region or a p-doped region. In an embodiment, the device channel 100 can be a $n^+/n^-/n^+$ doped or $p^+/p^-/p^+$ doped dual-junction poly or single crystalline silicon nanodevice channel, but not limited thereto. In an embodiment, the self-heating region 101 (i.e., the lightly-doped region) preferably has a doping dosage less than $1 \times 10^{14}/cm^2$, and the heavily-doped region 102 preferably has a doping dosage larger than $1 \times 10^{15}/cm^2$. Therefore, the power dissipation at the self-heating region 101 (e.g. $n^-$ region) is relatively larger, and the self-heating region 101 is capable of producing localized Joule heating. That is, the lightly-doped region is the self-heating region 101 of the gas sensing device 10A. The dielectric layer 130 is disposed on the device channel 100, and the sensing material 140 is disposed on the dielectric layer 130 and corresponds to the self-heating region 101. In other words, the sensing material 140 overlaps the self-heating region 101 of the device channel 100 with the dielectric layer 130 interposed therebetween to cover the upper side and two lateral sides of the device channel 100. In an embodiment, the dielectric layer 130 can be a single-layered structure of oxide or nitride. In another embodiment, the dielectric layer 130 can be a dual-layered structure including oxide and nitride. The sensing material 140 can be a metal material or a metal oxide semiconductor material. For example, the metal material can be selected from the group consisting of platinum (Pt), palladium (Pd), tungsten (W), Gold (Au) and iridium (Ir), and the metal oxide semiconductor material can be selected from the group consisting of tin oxide ($SnO_2$), titanium oxide ($TiO_2$), zinc oxide (ZnO), tungsten oxide ($WO_3$), indium oxide ($In_2O_3$), copper oxide (CuO), nickel oxide (NiO), cobalt oxide ($Co_3O_4$), chromium oxide ($Cr_2O_3$), Iron oxide ($Fe_2O_3$), aluminum oxide ($Al_2O_3$), and hafnium oxide (HfO), but not limited thereto.

Figure 3:
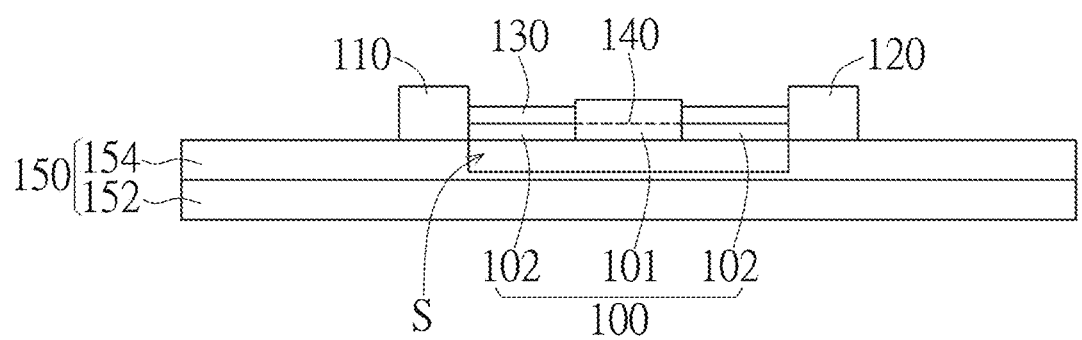
FIG. 3 is a schematic view of another embodiment of the gas sensing device used in the gas sensing method of the invention.

FIG. 3 is a schematic view of another embodiment of the gas sensing device used in the gas sensing method of the invention. As shown in FIG. 3, the gas sensing device 10B can have a suspension structure, so that a gap S is between the device channel 100 and the substrate 150. Specifically, the nanobelt or nanowire as the device channel 100 is suspended on the substrate 150, and the sensing material 140 overlaps the self-heating region 101 of the device channel 100 with the dielectric layer 130 interposed therebetween to cover the upper side, lower side, and two lateral sides of the device channel 100. In an embodiment, the gap S between the device channel 100 and the substrate 150 is preferably equal to or larger than 7 μm, so the gas sensing device 10B can have a three-dimensional reaction with the surrounding gases to improve the sensing effect.

Figure 4:
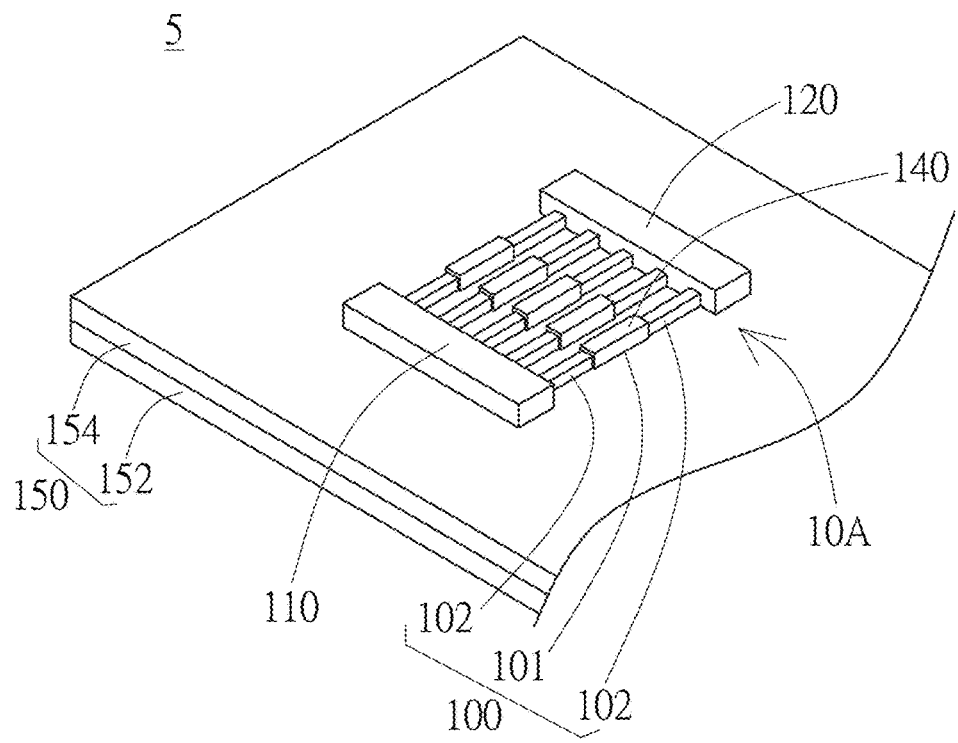
FIG. 4 is a schematic view of an embodiment of the gas sensing chip used in the gas sensing method of the invention.

Moreover, the gas sensing device 10A or 10B can be formed by semiconductor manufacturing processes, such as deposition, lithography, etching, ion implantation. Multiple gas sensing devices 10A, 10B can be disposed in an array on the insulation layer of the substrate to constitute a gas sensing chip. Referring to FIG. 4, FIG. 4 is a schematic view of an embodiment of the gas sensing chip used in the gas sensing method of the invention. In this embodiment, five gas sensing devices (e.g. 10A) are arranged in one group, and adjacent device channels 100 are preferably spaced apart by a distance preferably equal to or larger than 7 μm. In the same group, the device channels 100 are preferably connected to a common source 110 and a common drain 120, so the gas sensing devices 10A in the same group can be effectively controlled at the same time, but not limited thereto. The number of gas sensing devices 10A (or 10B) can be one or more, and the number of gas sensing devices in each group can be the same or different. The sensing material 140 is selected based on the target gas to be sensed, and in the embodiment including multiple gas sensing devices, the sensing material in each group can be the same or different, so as to sense the same or different target gases.

Specifically, when the gas sensing device 10A (or 10B) senses the target gas, the sensing material 140 will absorb the target gas, so the self-heating region 101 (e.g. the lightly-doped region) corresponding to the sensing material 140 will change in resistance according to the concentration of the target gas sensed by the gas sensing material 10A (or 10B). Since the self-heating region 101 can produce the self-heating effect, the change in resistance will cause the change in temperature of the self-heating region 101, so that the temperature of the gas sensing device 10A (or 10B) will deviate from the predetermined sensing temperature. In the step S12 of the gas sensing method, the step of controlling the change in supply of current or voltage includes: controlling the change in supply of current or voltage to the gas sensing device to compensate for the change in temperature of the self-heating region. As such, the gas sensing device can be substantially maintained operating at the predetermined temperature. For example, the predetermined temperature can be a temperature range or a specific temperature. In an embodiment, the gas sensing method determines the predetermined temperature based on the target gas and the sensing material. For example, a specific material will have a better sensing temperature (or temperature range) for the target gas to obtain a better gas response and to improve the response speed and the recovery speed. The predetermined temperature is set to the better sensing temperature (or temperature range), which corresponds to the sensing material having a greater gas response to the target gas, so as to improve the sensing effect, but not limited thereto. In another embodiment, the predetermined temperature can be set to the operable temperature (or temperature range), at which the gas sensing device is capable of sensing the target gas, to improve the workability of the gas sensing device.

As shown in FIG. 1, in the step S12 of the gas sensing method, the step of controlling the change in supply of current or voltage to the gas sensing device according to the change in resistance includes: step S14, obtaining a resistance of the self-heating region, and step S16, determining a change in power corresponding to the change in resistance according to the resistance, and controlling the change in supply of current or voltage to the gas sensing device according to the change in power, so that the gas sensing device is substantially operated at a constant power. Specifically, the temperature of the self-heating region caused by the self-heating effect is substantially positively correlated with the power of the gas sensing device. When the gas sensing device is operated at constant power, the temperature of the gas sensing device is substantially constant. As such, controlling the supply of current or voltage to the gas sensing device according to the change in resistance of the self-heating region can enable the gas sensing device to be operated in the constant power mode, so as to sense the target gas under a substantially constant temperature (e.g. the predetermined temperature). In an embodiment, in the step S14, the step of obtaining the resistance of the self-heating region can include: measuring current flowing through the self-heating region, and calculating the resistance based on the voltage supplied to the gas sensing device, but not limited thereto. In another embodiment, in the step S14, the step of obtaining the resistance of the self-heating region can include: measuring voltage between two ends of the self-heating region, and calculating the resistance based on the current supplied to the gas sensing device.

Moreover, in an embodiment, in the step S16, the step of determining the change in power corresponding to the change in resistance according to the resistance can include: comparing a power corresponding to the resistance with a predetermined power corresponding to the predetermined temperature to calculate the change in power. For example, the predetermined power can be the power required when a predetermined voltage is applied to the gas sensing device to cause the self-heating region to produce the self-heating effect to reach the predetermined temperature. The power corresponding to the resistance obtained during measurement can be calculated based on the voltage (or current) supplied to the gas sensing device and the measured current (or voltage) during measurement. Since the change in power at least partially corresponds to the change in temperature of the self-heating region caused by the self-heating effect, controlling the change in supply of current or voltage to the gas sensing device according to the change in power can ensure the gas sensing device to be substantially operated in the constant power mode, so as to compensate for the change in temperature of the self-heating region caused by the self-heating effect, and to make the gas sensing device be substantially maintained operating at the predetermined temperature when sensing the target gas. In an embodiment, the step of controlling the change in supply of current or voltage to the gas sensing device can include: controlling the voltage supplied to the gas sensing device by a pulse width modulation (PWM) or an alternating current (AC), but not limited thereto.

Figure 5:
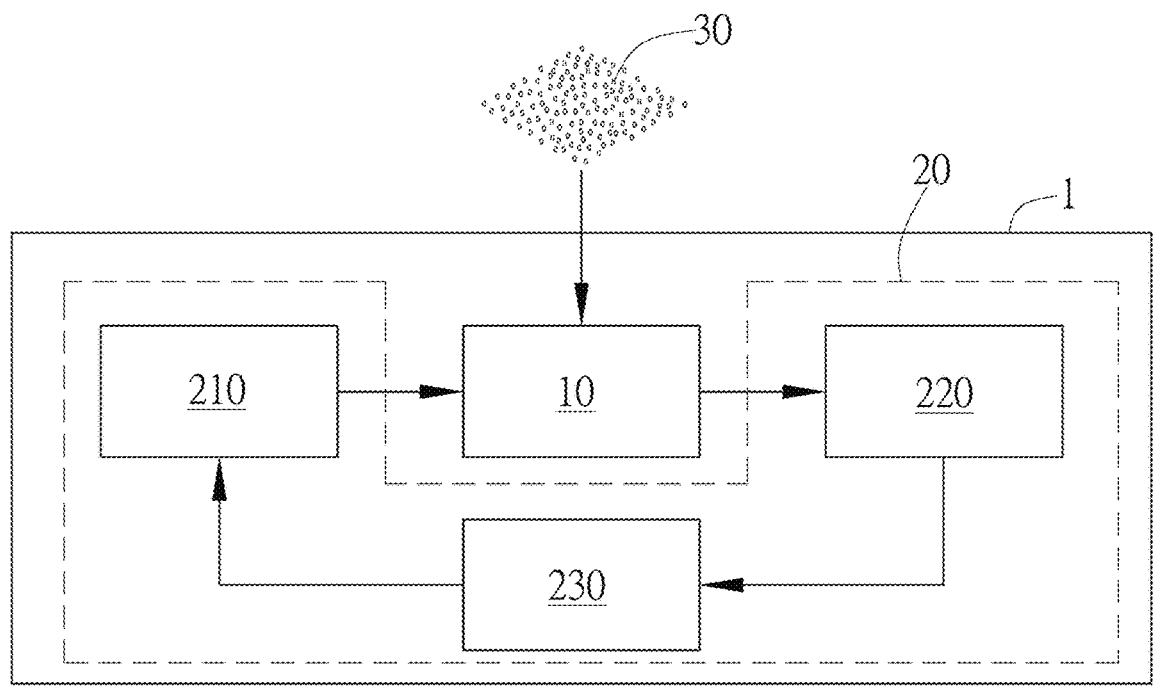
FIG. 5 is a schematic block diagram of an embodiment of the gas sensing system of the invention.

In another embodiment, the invention further provides a gas sensing system, which can perform the gas sensing method of FIG. 1. Referring to FIG. 5, FIG. 5 is a schematic block diagram of an embodiment of the gas sensing system 1 of the invention. As shown in FIG. 5, the gas sensing system 1 include a gas sensing device 10 and a control unit 20. In an embodiment, the gas sensing device 10 can be the gas sensing device (10A or 10B) of FIG. 2 or FIG. 3, or the gas sensing chip 5 of FIG. 4, but not limited thereto. The gas sensing device 10 can be any gas sensor having the self-heating region as appropriate. The control unit 20 is configured to control a change in supply of current or voltage to the gas sensing device 10 according to the change in resistance of the self-heating region (e.g. 101), so that the gas sensing device 10 is substantially maintained operating at a predetermined temperature for sensing the target gas 30. Specifically, the change in resistance causes the change in temperature of the self-heating region, and the control unit 20 controls the change in supply of current or voltage to the gas sensing device 10 to compensate for the change in temperature of the self-heating region. In other words, the gas sensing system 1 and the gas sensing method of the invention utilize feedback control to modulate the current or voltage supplied to the gas sensing device, so as to compensate for the change in temperature of the self-heating region caused by the change in resistance, which varies with the concentration of the target gas 30, so that the gas sensing device 10 can be substantially operated in a constant power mode (or maintained operating at a predetermined sensing temperature) to sense the target gas 30.

In this embodiment, the control unit 20 can include a power source 210, a measuring unit 220, and a feedback unit 230. The power source 210, the measuring unit 220, and the feedback unit 230 can be embodied as circuits or chips having corresponding functions which are electrically connected to the gas sensing device 10, or can be integrated with the gas sensing device 10 into an integral sensing chip or can be independent circuits or chips, so as to enable the gas sensing system 1 to perform the gas sensing method 1000 described above, but not limited thereto. In an embodiment, the power source 210 is configured to supply current or voltage to the gas sensing device 10. The measuring unit 220 is configured to obtain the resistance of the self-heating region. The feedback unit 230 is configured to determine the change in power corresponding to the change in resistance according to the resistance, and the power source 210 changes the supply of current or voltage to the gas sensing device 10 according to the change in power, so that the gas sensing device 10 is substantially operated at a constant power for sensing the target gas 30. In an embodiment, the power source 210 can supply a predetermined voltage to the gas sensing device 10, and the measuring unit 220 can measure the current flowing through the self-heating region, so that the resistance of the self-heating region can be calculated based on the supplied voltage and the measured current. In another embodiment, the power source 210 can supply a predetermined current to the gas sensing device 10, and the measuring unit 220 can measure the voltage between two ends of the self-heating region, so that the resistance of the self-heating region can be calculated based on the supplied current and the measured voltage. For example, the current flowing through the self-heating region or the voltage between two ends of the self-heating region can be obtained by measuring the current or voltage between the source (e.g. 110) and the drain (e.g. 120) of the gas sensing device, but not limited thereto.

The feedback unit 230 is configured to compare the power corresponding to the obtained resistance with a predetermined power corresponding to the predetermined temperature to calculate the change in power, which is caused by the change in resistance of the self-heating region. The power source 210 is configured to modulate the supply of current or voltage to the gas sensing device 10 according to the change in power, so that the gas sensing device 10 can be substantially maintained operating at the predetermined temperature to sense the target gas 30. Specifically, the feedback unit 230 can send a control signal indicating the change in power to the power source 210, and the power source 210 changes the supply of current or voltage to the gas sensing device 10 according to the change in power, so that the gas sensing device 10 is substantially operated in the constant power mode for sensing the target gas 30. The details of the gas sensing method performed by the gas sensing system 1 can refer to the related descriptions described above, and will not elaborate again. For example, the feedback unit 230 can compare the power corresponding to the resistance obtained by the measuring unit 220 with the predetermined power corresponding to the predetermined temperature to calculate the change in power. The power source 210 can supply the voltage to the gas sensing device 10 by a pulse width modulation or an alternating current in response to the control signal from the feedback unit 230.

Figure 6:
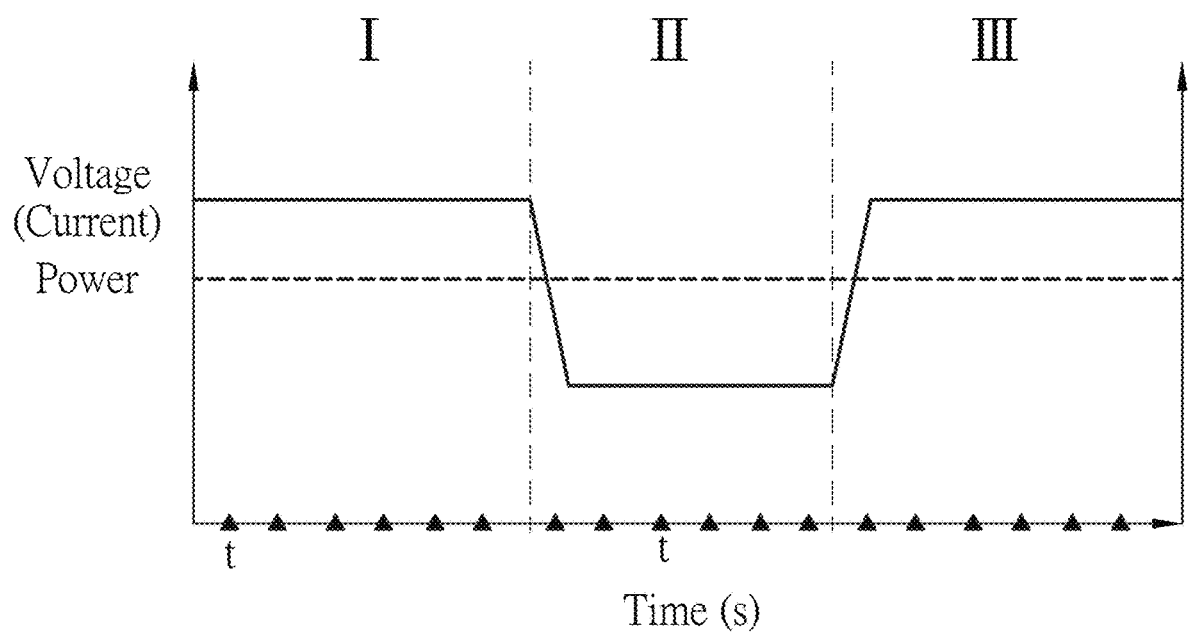
FIG. 6 is a schematic diagram of the sensing process performed by the gas sensing system using the gas sensing method of FIG. 1.

Referring to FIG. 6, FIG. 6 is a schematic diagram of the sensing process performed by the gas sensing system using the gas sensing method of FIG. 1. As shown in FIG. 6, the gas sensing device is substantially maintained operating in the constant power mode, and the sensing process is divided into zone I, zone II, and zone III according to the operation time. In zone I and zone II (e.g. the time periods that no target gas of known concentration is introduced during the test), the gas sensing device 10 senses no target gas 30, and the control unit 20 utilizes feedback control, so that the gas sensing device 10 is operated in the constant power mode. During these time periods, since no target gas 30 is absorbed by the sensing material (e.g. 140), the resistance of the self-heating region is substantially unchanged, and the change in resistance (or change in power) is substantially zero. As such, the change in current or voltage supplied by the power source 210 is substantially zero (i.e., the supply of current or voltage is substantially constant), so that the gas sensing device 10 is substantially maintained operating at the predetermined temperature. In zone II (e.g. the time period that the target gas of known concentration is introduced during the test), the target gas 30 is absorbed by the sensing material (e.g. 140) of the gas sensing device 10, and the resistance of the self-heating region (e.g. the lightly-doped region) is changed. The gas sensing system 1 utilizes the feedback control of the control unit 20 to modulate the voltage (or current) supplied to the gas sensing device 10, so that the gas sensing device 10 is substantially maintained operating in the constant power mode. Specifically, the gas sensing system 1 measures (obtains) the resistance and calculates the change in power at the same time at a predetermined time interval, so as to modulate the supply of voltage (or current) to the gas sensing device 10 and to make the gas sensing device 10 be substantially operated at the constant power. In an embodiment, the time interval for each measurement point (t) is preferably fixed (i.e., the same time interval), such as about seconds to milliseconds, and the resistance obtained from every measurement point (t) can be considered as the response signal for sensing the target gas.

Referring to FIG. 7A to FIG. 9B, the comparison of test results of the gas sensing method of the invention and the comparative method of constant voltage measurement will be illustrated. In this embodiment, the sensing material is palladium, and the target gas is hydrogen gas. The sensitivity is represented by the response of the gas sensing device, i.e., the degree to which the target gas changes the resistance of the gas sensing device, which is the difference between the baseline of the signal and the peak and then normalized, i.e., Response=$(R-R_0)/R_0*100(\%)$, wherein R is the resistance obtained at the measurement point, and $R_0$ is the resistance obtained when a predetermined voltage or current is supplied. The response time (T90) is the time interval from the moment when the target gas is introduced (i.e., the moment that the baseline starts to change) to the time when the sensitivity (i.e., the response) reaches 90% of the peak. The recovery time (T10) is the time interval from the moment when the background gas is introduced (i.e., when the introduction of the target gas is stopped, and the signal starts to decrease from the peak) to the time when the sensitivity (i.e., the response) reaches 10% higher than the baseline.

Figure 7A:
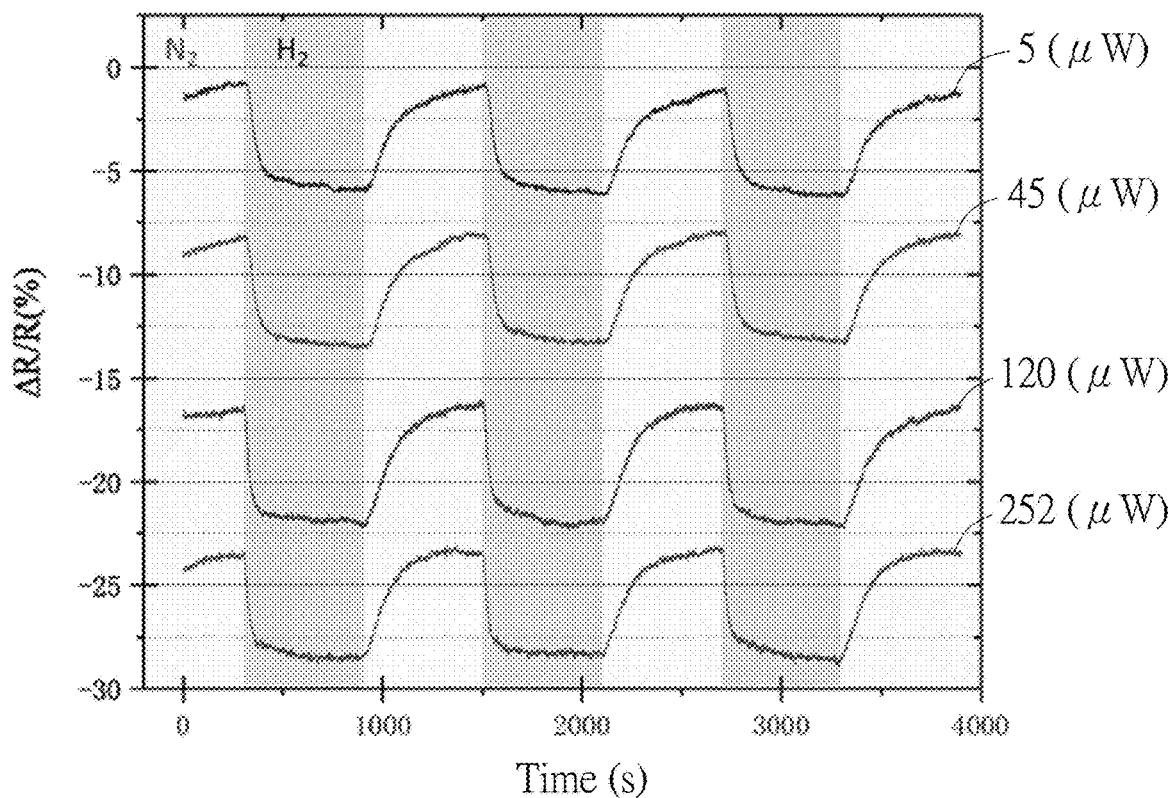
FIGS. 7A and 7B are respectively the measurement response diagrams of the sensitivity and time of the gas sensing method of the invention and the comparative method of constant voltage measurement.
Figure 7B:
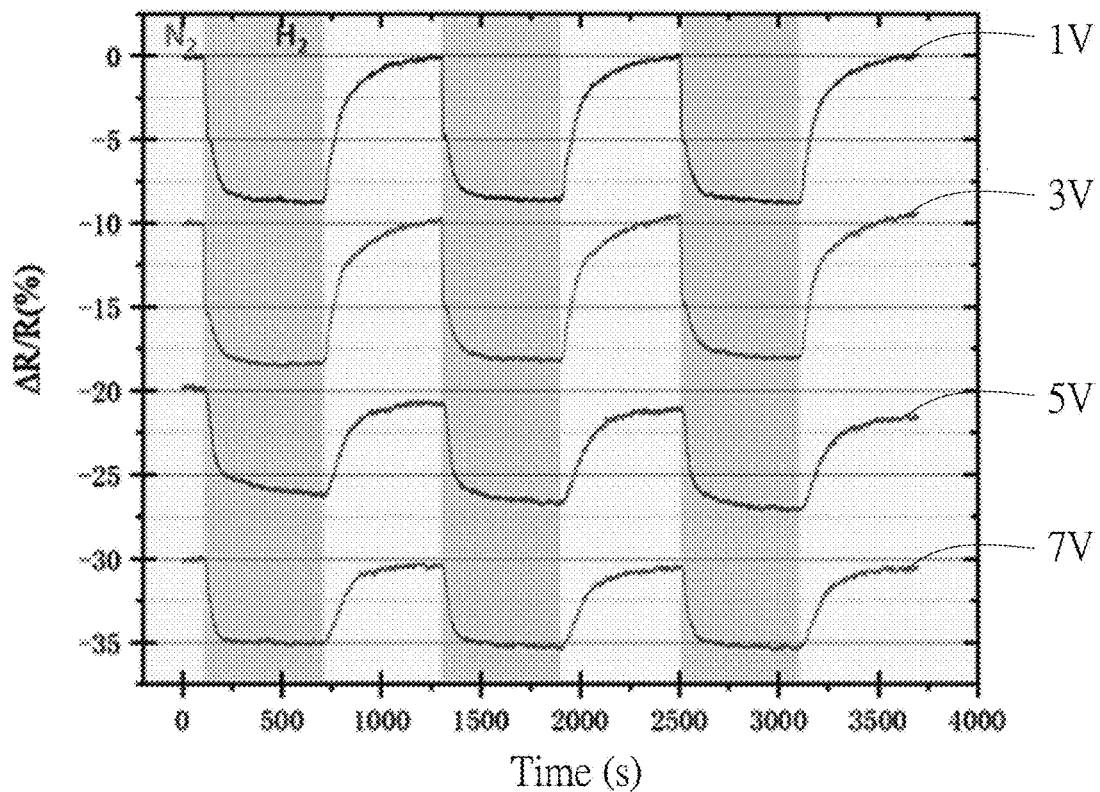

FIGS. 7A and 7B are respectively the measurement response diagrams of the sensitivity and time of the gas sensing method of the invention and the comparative method of constant voltage measurement. As shown in the figures, because the response obtained from the comparative method of constant voltage measurement includes the gas response and the response caused by the internal temperature change of the gas sensing device, instead of only the gas response, the response value of FIG. 7B obtained from the comparative method of constant voltage measurement is larger than that of the gas sensing method of the invention. That is, the response obtained from the gas sensing method of the invention substantially reflects the response only caused by the target gas. Moreover, the gas response is not necessarily positively correlated with the temperature. When the gas response is negatively correlated with the temperature, the response obtained from the comparative method of constant voltage measurement will be a response deducting the temperature response from the gas response, so that the response value obtained from the comparative method of constant voltage measurement is smaller than that of the gas sensing method of the invention. As such, the gas sensing method of the invention is more suitable for multi-gas detection than the comparative method of constant voltage measurement.

Figure 8A:
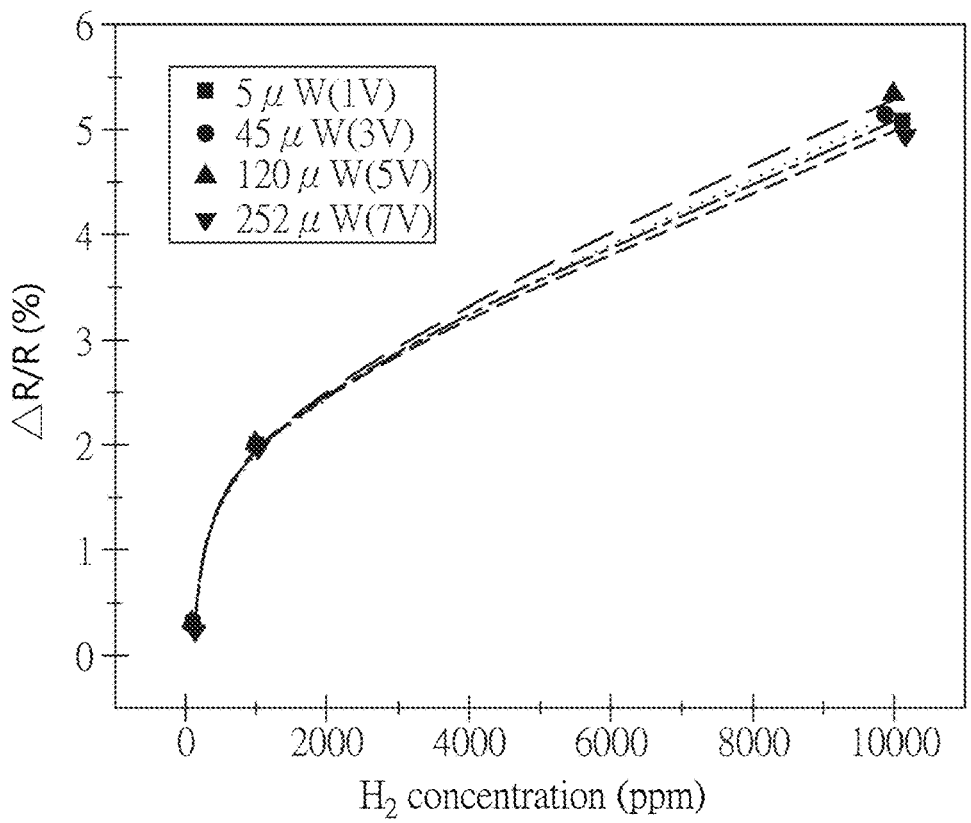
FIGS. 8A and 8B are respectively the measurement response diagrams of the sensitivity and concentration of the gas sensing method of the invention and the comparative method of constant voltage measurement.
Figure 8B:
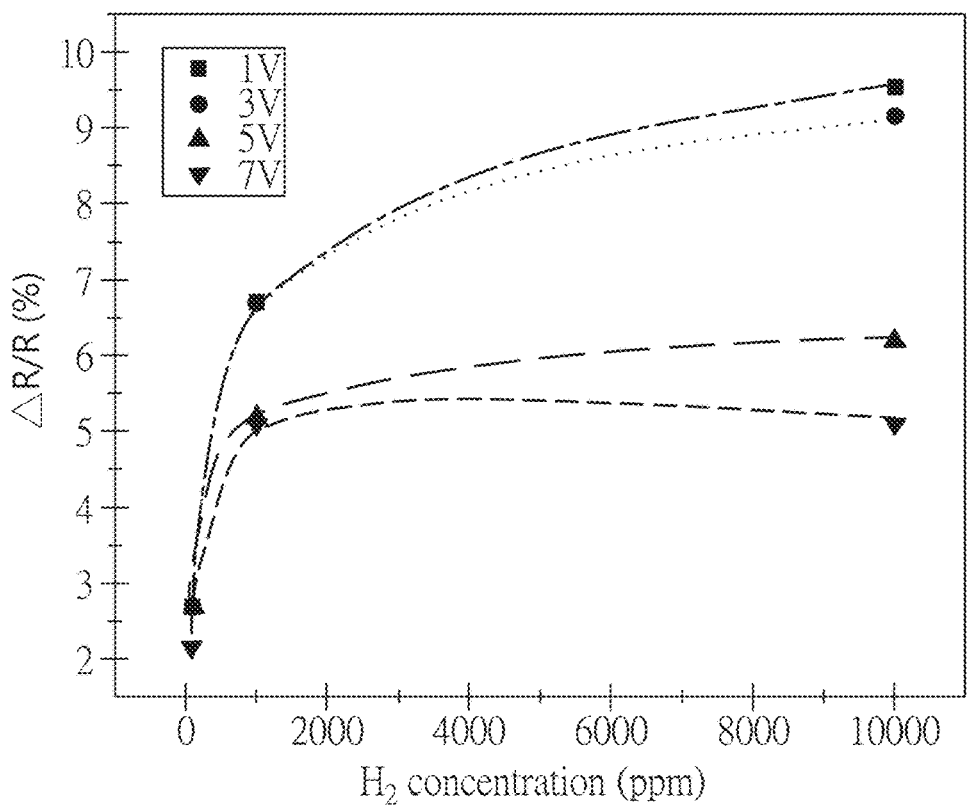

FIGS. 8A and 8B are respectively the measurement response diagrams of the sensitivity and concentration of the gas sensing method of the invention and the comparative method of constant voltage measurement. it can be seen from FIGS. 8A and 8B that the gas sensing method of the invention can not only obtain a more realistic response, but also have a more consistent response to the target gases of different concentrations. The signals of the gas sensing device exhibit a better linearity on the change in gas concentration, which facilitates the operation of subsequent algorithms and makes the gas sensing system be easier commercialized.

Figure 9A:
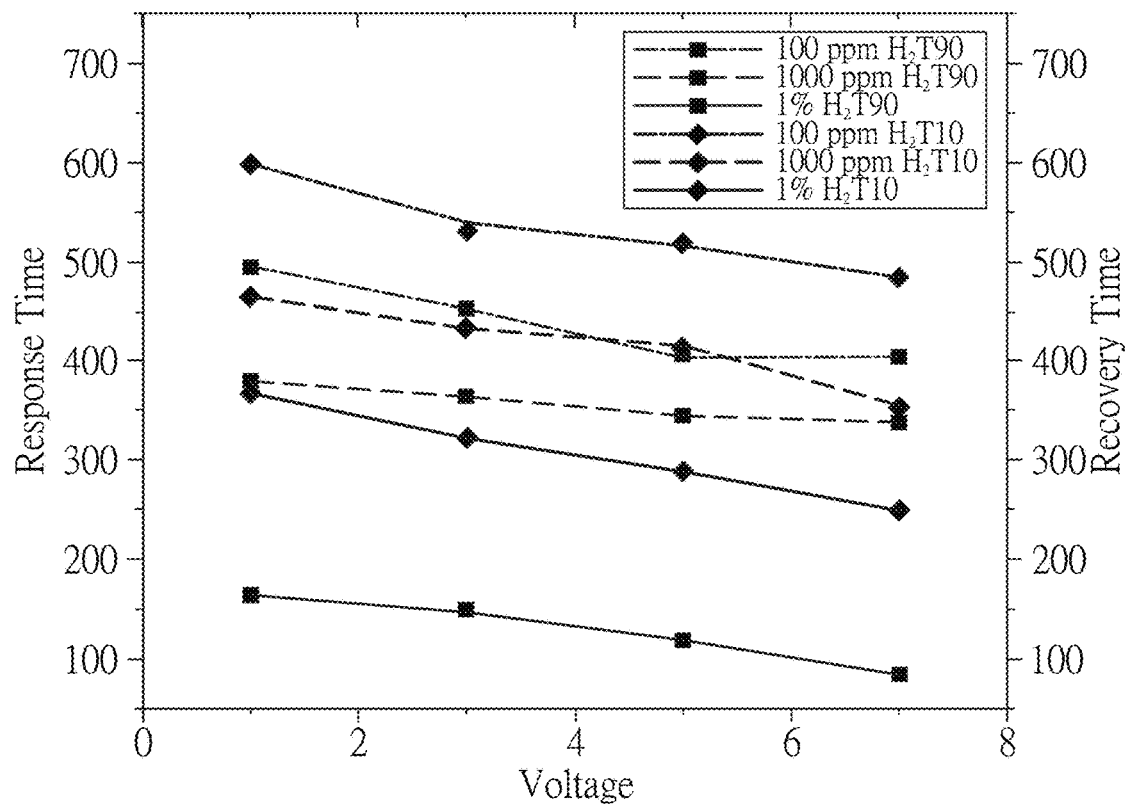
FIGS. 9A and 9B are respectively the measurement response diagrams of the response time/recovery time and voltage of the gas sensing method of the invention and the comparative method of constant voltage measurement.
Figure 9B:
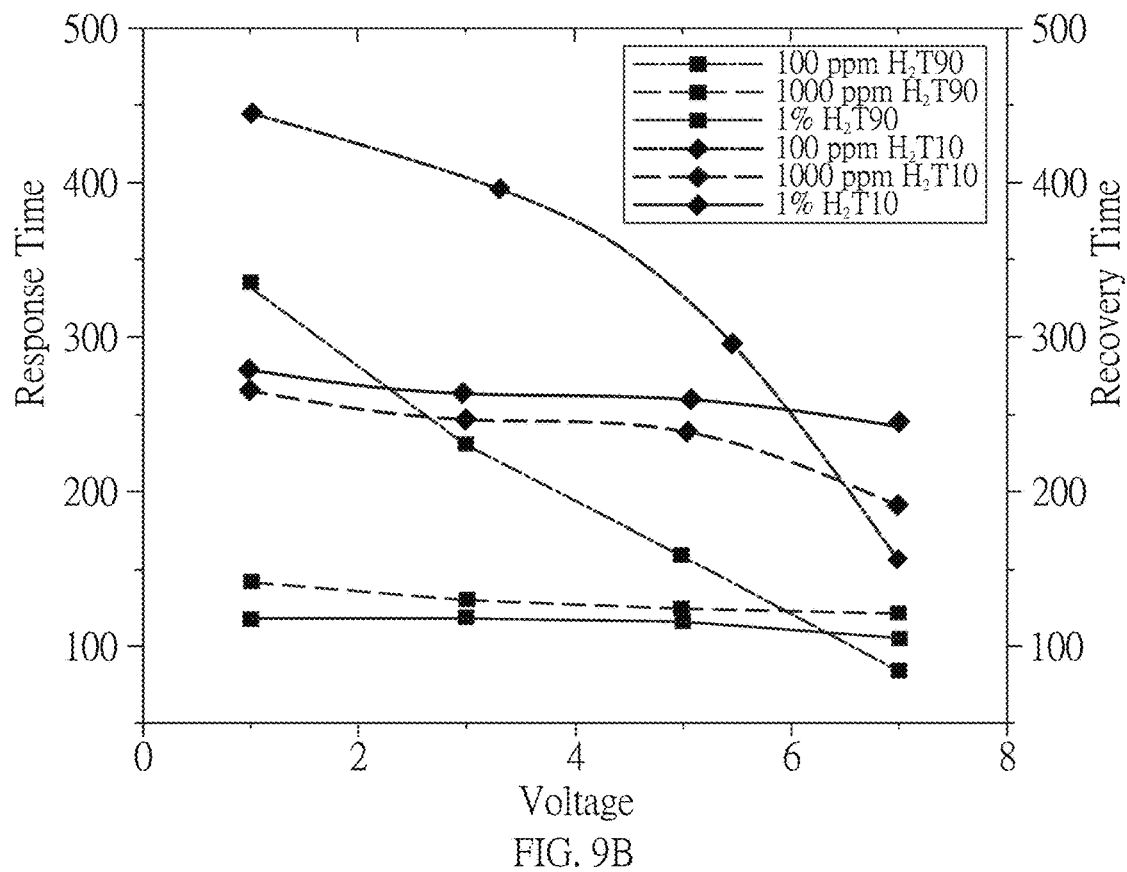

FIGS. 9A and 9B are respectively the measurement response diagrams of the response time/recovery time and voltage of the gas sensing method of the invention and the comparative method of constant voltage measurement. It can be seen from FIGS. 9A and 9B that from the aspect of response time/recovery time, since the gas sensing method of the invention eliminates the internal thermal influence on the gas sensing device, the gas sensing device can be operated at any suitable power, and the sensing time will be more consistent. When the gas sensing system is applied to the wearable device, a more suitable operation can be achieved.

Figure 10:
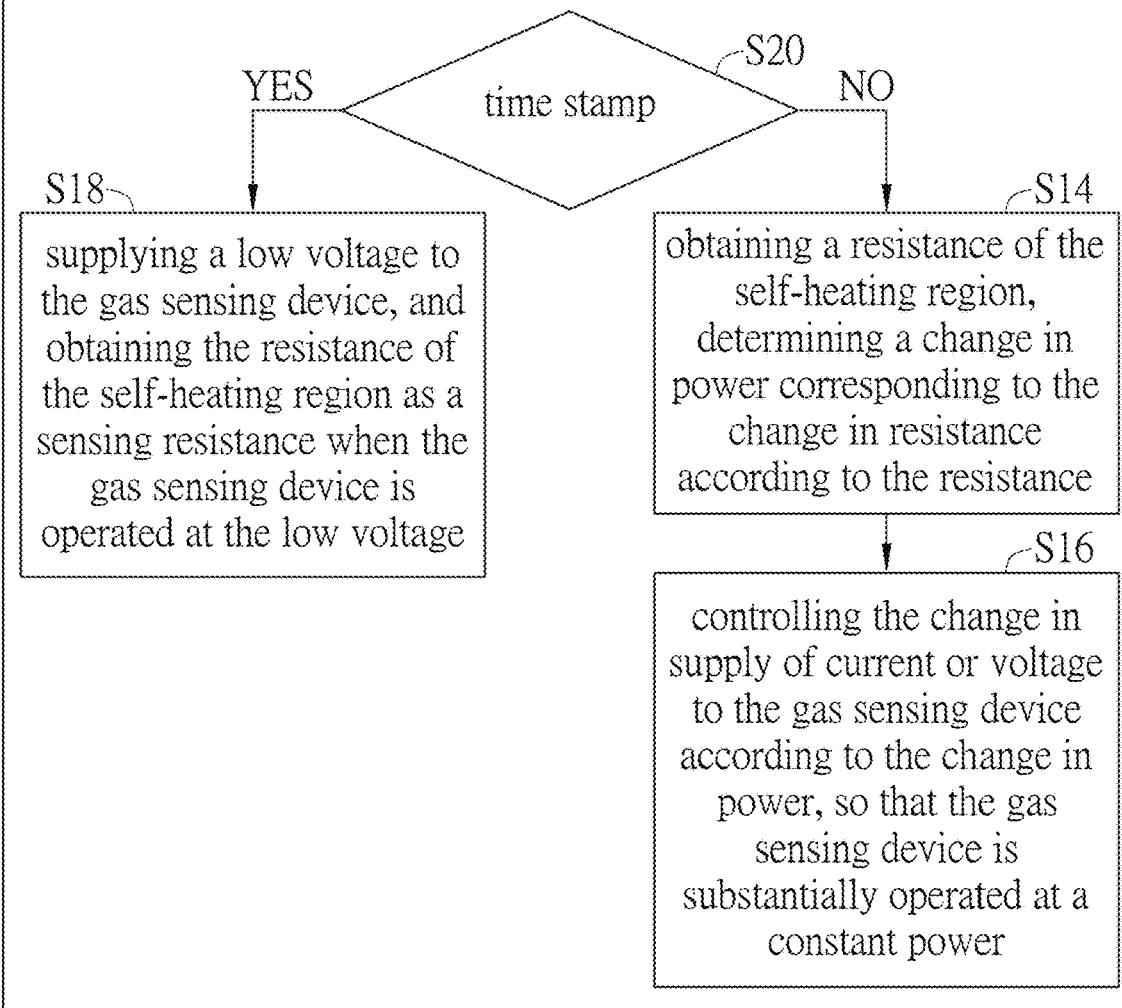
FIG. 10 is a flowchart of another embodiment of the gas sensing method of the invention.

Referring to FIG. 10, FIG. 10 is a flowchart of another embodiment of the gas sensing method 1100 of the invention. The gas sensing method 1100 is different from the gas sensing method 1000 of FIG. 1 in that in the step S12, the step of controlling the change in supply of current or voltage to the gas sensing device according to the change in resistance includes: controlling the change in supply of current or voltage according to a time stamp. For example, the change in supply of current or voltage is controlled according to the time stamp, so as to perform the feedback control or to supply a low voltage to obtain the resistance as the sensing signal. Specifically, in step S20, when the time stamp is negative, the step S14 of obtaining a resistance of the self-heating region, and the step of S16 of determining a change in power corresponding to the change in resistance according to the resistance, and controlling the change in supply of current or voltage to the gas sensing device according to the change in power are performed, so that the gas sensing device is substantially operated at a constant power for sensing the target gas, similar to the feedback control of FIG. 1. In addition, in the step S20, when the time stamp is positive, the step S18 is performed to supply a low voltage to the gas sensing device, and obtain (or measure) the resistance of the self-heating region as a sensing resistance when the gas sensing device is operated at the low voltage. For example, the resistance of the self-heating region when the gas sensing device is operated at the low voltage can be calculated based on the measured current and the supplied low voltage.

Figure 11:
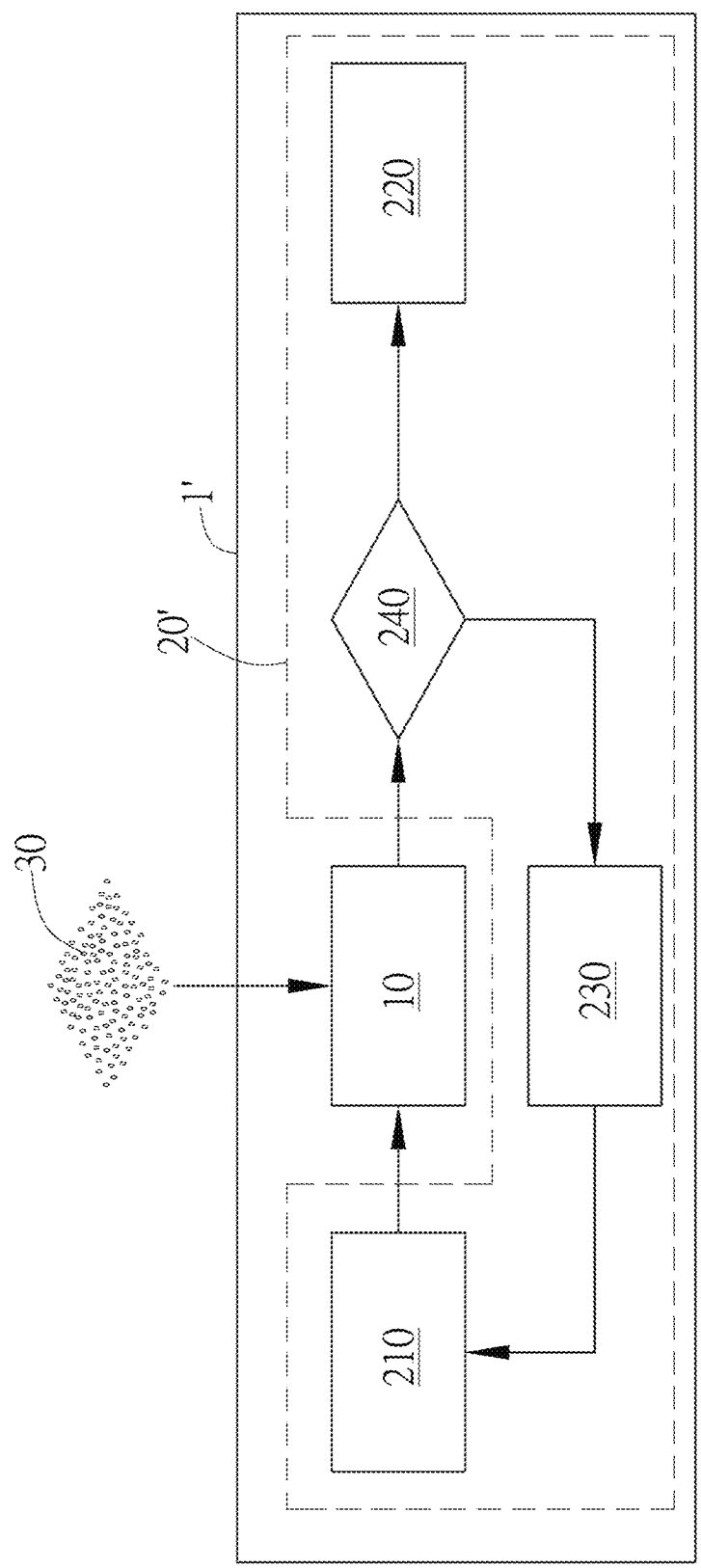
FIG. 11 is a schematic block diagram of another embodiment of the gas sensing system of the invention.

In response to the gas sensing method of FIG. 10, FIG. 11 is a schematic block diagram of another embodiment of the gas sensing system 1', which can perform the gas sensing method 1100 of FIG. 10. As shown in FIG. 11, the gas sensing system 1' includes the gas sensing device 10 and a control unit 20'. In this embodiment, the gas sensing device 10 can refer to the related descriptions of the previous embodiment, and the difference between the control unit 20' and the previous embodiment will be illustrated. In this embodiment, the control unit 20' is configured to control the change in supply of current or voltage according to a time stamp 240, and the time stamp 240 can be embodied as a circuitry or a signal. For example, the time stamp can be a preset value of time. When the measurement time is equal to a multiple of the time stamp, the time stamp is determined to be positive, and the gas sensing system receives the signal indicating that the time stamp is positive, so that the voltage supplied to the gas sensing device is a low voltage. When the measurement time is not equal to a multiple of the time stamp, the time stamp is determined to be negative, and the gas sensing system is operated in the constant power mode with feedback control, but not limited thereto. In another embodiment, according to practical applications, the time stamp can be multiple predetermined measurement points, and the time interval between every successive two measurement points can be the same or different. The time stamp can be determined according to the type and concentration of the target gas and the speed of changing the resistance of the gas sensing device. When the time stamp 240 is negative (i.e., the measurement time is not a multiple of the time stamp), the feedback unit 230 is configured to determine the change in power corresponding to the change in resistance according to the resistance obtained by the measuring unit 220, and the power source 210 is configured to change the supply of current or voltage to the gas sensing device 10 according to the change in power, so that the gas sensing device 10 is substantially operated at the constant power for sensing the target gas 30. When the time stamp 240 is positive (i.e., the measurement time is a multiple of the time stamp), the power source 210 is configured to supply a low voltage to the gas sensing device 10, and the measuring unit 220 is configured to obtain the resistance of the self-heating region as a sensing resistance (i.e., response signal) when the gas sensing device 10 is operated at the low voltage. In an embodiment, the low voltage can be a voltage that makes the gas sensing device in an unheated state, i.e., in a state that the self-heating region does not produce the self-heating effect. For example, the low voltage can be equal to or less than 1V, but not limited thereto.

Figure 12:
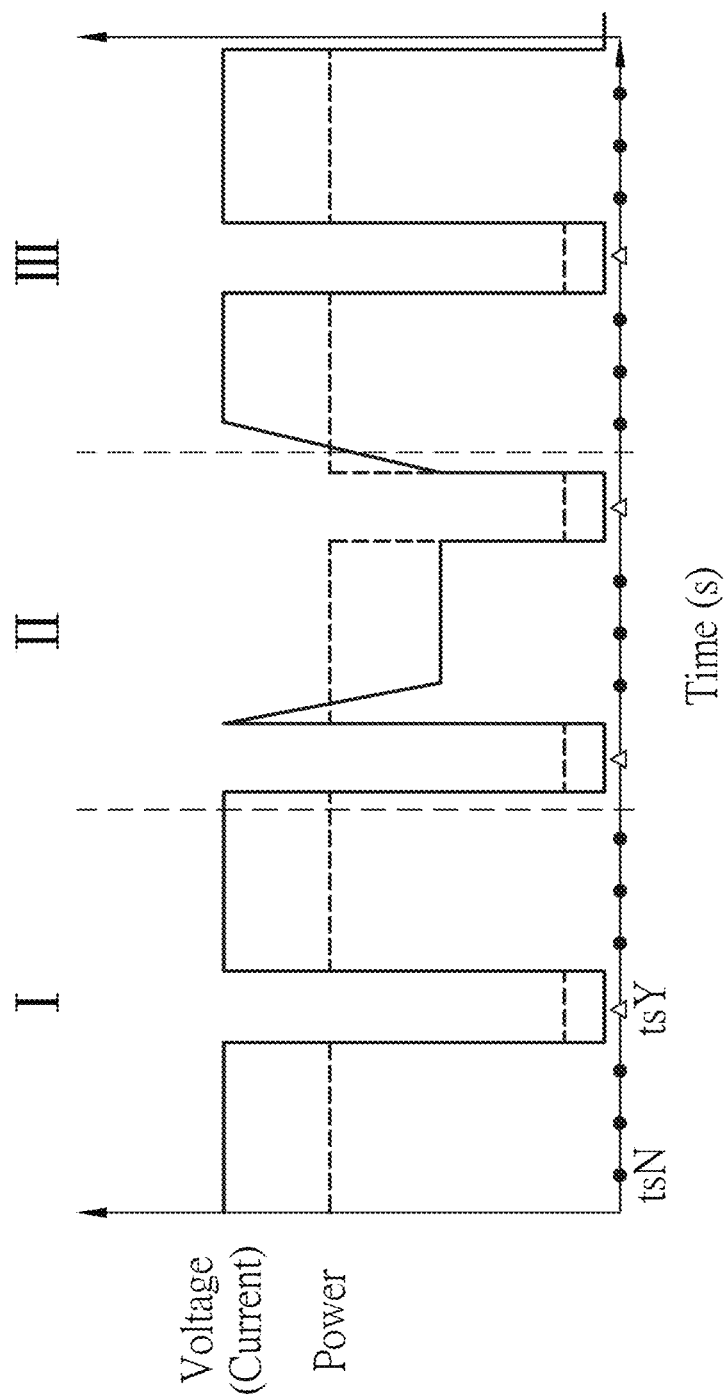
FIG. 12 is a schematic diagram of the sensing process performed by the gas sensing system using the gas sensing method of FIG. 10.
Figures 13A, 13B, 13C, 13D, 13E, 13F, 13G, 13H:
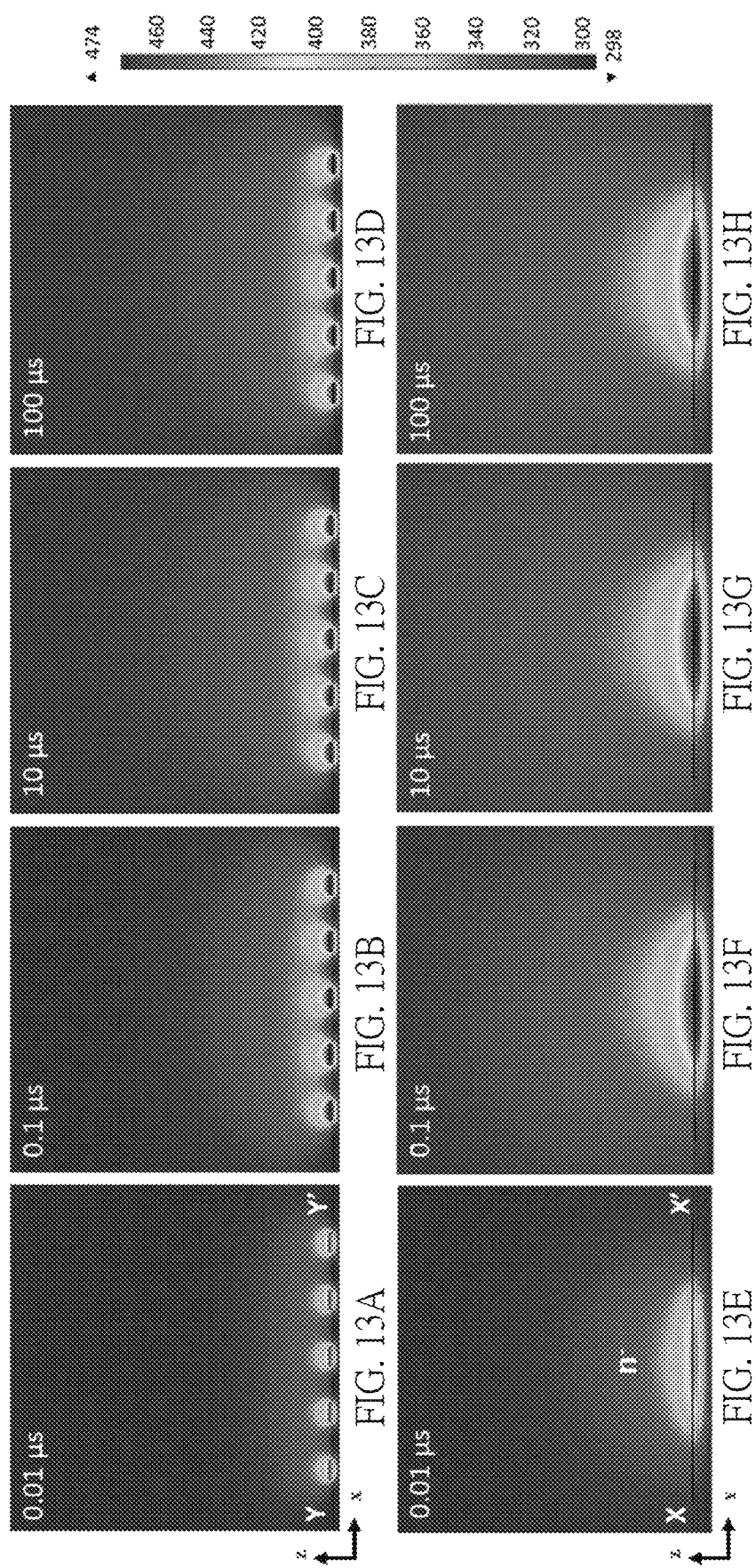
FIG. 13A to FIG. 13H are schematic diagrams showing the temperature of the gas sensing device varying with time.

Referring to FIG. 12, FIG. 12 is a schematic diagram of the sensing process performed by the gas sensing system 1' using the gas sensing method of FIG. 10. As shown in FIG. 12, in zone I, zone II, and zone III, when the time stamp 240 is negative (e.g. at measurement points "tsN"), the control unit 20' utilizes feedback control to calculate the change in power according the change in resistance and to modulate the voltage (or current) supplied to the gas sensing device 10, so that the gas sensing device 10 is operated in the constant power mode (i.e., substantially operated at the predetermined temperature) for a predetermined time period, such as tens of milliseconds to hundreds of milliseconds. When the time stamp 240 is positive (e.g. at measurement points "tsY"), the low voltage is supplied to the gas sensing device 10, and the resistance of the self-heating is measured (or obtained by calculating based on the supplied low voltage and the measure current) when the gas sensing device 10 is operated at the low voltage. As such, in a short time period (i.e., the low voltage measurement period, such as a few milliseconds), the temperature of the gas sensing device 10 will drop to the room temperature, and the target gas absorbed by the sensing material has not been desorbed. At such a time period, the measured resistance of the self-heating region substantially includes only the response of the target gas 30 to the gas sensing device 10 without the temperature response to the gas sensing device 10. FIG. 13A to FIG. 13H are schematic diagrams showing the temperature of the gas sensing device varying with time. Since the size of the gas sensing device 10 is extremely small (for example, the device channel 100 is in nanometer scale with a length of 13 μm, a width of 0.5 μm and a thickness of 59 nm; each of the heavily-doped regions has a length of 5.5 μm; the lightly-doped region (i.e., self-heating region 101) has a length of 2 μm), the temperature of the gas sensing device 10 can be quickly increased and decreased within a few milliseconds. Supplying the low voltage to measure the resistance of the gas sensing device 10 when operating in the low voltage mode does not substantially affect the gas sensing device 10 to sense the target gas, and can reduce the power consumption. Moreover, as shown in FIG. 9A, the desorption of target gas requires a longer time, such as more than tens of seconds, and supplying the low voltage to measure the resistance of the gas sensing device 10 when operating in the low voltage mode for a few milliseconds does not substantially affect the accuracy of the response signal obtained therefrom.

It can be seen from FIG. 12, with the gas sensing method of FIG. 10, the gas sensing device can be operated at a predetermined temperature to sense the target gas, but when measuring the response signal, it can be measured in a low voltage mode (such as room temperature) to make the self-heating region of the gas sensing device substantially have no temperature change (e.g. no self-heating effect), which not only reduces the power consumption of the gas sensing system, but also does not require long-term operation of the gas sensing device in a high voltage state, thereby increasing the life of the gas sensing device.

Although the preferred embodiments of present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. A gas sensing method, comprising:
using a gas sensing device to sense a target gas, the gas sensing device comprising a device channel, a source and a drain at two ends of the device channel, a dielectric layer on the device channel, and a sensing material on the dielectric layer, the device channel comprising a self-heating region, the sensing material overlapping the self-heating region, the self-heating region producing a change in resistance according to a concentration of the target gas being absorbed by the sensing material of the gas sensing device; and
controlling a change in supply of current or voltage to the gas sensing device according to the change in resistance, so that the gas sensing device is maintained operating at a predetermined temperature for sensing the target gas.

2. The gas sensing method of claim 1, wherein the step of controlling the change in supply of current or voltage comprises:
obtaining a resistance of the self-heating region;
determining a change in power corresponding to the change in resistance according to the resistance; and controlling the change in supply of current or voltage to the gas sensing device according to the change in power, so that the gas sensing device is operated at a constant power.

3. The gas sensing method of claim 1, wherein the step of controlling the change in supply of current or voltage comprises: controlling the change in supply of current or voltage according to a time stamp, wherein:
when the time stamp is negative, obtaining a resistance of the self-heating region, determining a change in power corresponding to the change in resistance according to the resistance, and controlling the change in supply of current or voltage to the gas sensing device according to the change in power, so that the gas sensing device is operated at a constant power; and
when the time stamp is positive, supplying a low voltage to the gas sensing device, and obtaining the resistance of the self-heating region as a sensing resistance when the gas sensing device is operated at the low voltage.

4. The gas sensing method of claim 2, wherein the step of obtaining the resistance of the self-heating region comprises:
measuring current flowing through the self-heating region, and calculating the resistance based on the voltage supplied to the gas sensing device; or
measuring voltage between two ends of the self-heating region, and calculating the resistance based on the current supplied to the gas sensing device.

5. The gas sensing method of claim 2, wherein the step of determining the change in power comprises:
comparing a power corresponding to the resistance with a predetermined power corresponding to the predetermined temperature to calculate the change in power.

6. The gas sensing method of claim 1, wherein the step of controlling the change in supply of current or voltage comprises:
controlling the voltage supplied to the gas sensing device by a pulse width modulation or an alternating current.

7. The gas sensing method of claim 1, wherein the predetermined temperature is determined based on the target gas and the sensing material.

8. The gas sensing method of claim 1, wherein the change in resistance causes a change in temperature of the self-heating region, and the step of controlling the change in supply of current or voltage comprises:
controlling the change in supply of current or voltage to the gas sensing device to compensate for the change in temperature of the self-heating region.

9. A gas sensing system, comprising:
a gas sensing device comprising a device channel, a source and a drain at two ends of the device channel, a dielectric layer on the device channel, and a sensing material on the dielectric layer, the device channel comprising a self-heating region, the sensing material overlapping the self-heating region, the self-heating region producing a change in resistance according to a concentration of a target gas being absorbed by the sensing material of the gas sensing device; and
a control unit configured to control a change in supply of current or voltage to the gas sensing device according to the change in resistance, so that the gas sensing device is maintained operating at a predetermined temperature for sensing the target gas.

10. The gas sensing system of claim 9, wherein the control unit comprises a power source, a measuring unit, and a feedback unit; the power source is configured to supply current or voltage to the gas sensing device; the measuring unit is configured to obtain a resistance of the self-heating region; the feedback unit is configured to determine a change in power corresponding to the change in resistance according to the resistance, and the power source changes the supply of current or voltage to the gas sensing device according to the change in power, so that the gas sensing device is operated at a constant power for sensing the target gas.

11. The gas sensing system of claim 10, wherein the control unit controls the change in supply of current or voltage according to a time stamp, wherein:
when the time stamp is negative, the feedback unit determines the change in power corresponding to the change in resistance according to the resistance, and the power source changes the supply of current or voltage to the gas sensing device according to the change in power, so that the gas sensing device is operated at the constant power for sensing the target gas; and
when the time stamp is positive, the power source supplies a low voltage to the gas sensing device, and the measuring unit is configured to obtain the resistance of the self-heating region as a sensing resistance when the gas sensing device is operated at the low voltage.

12. The gas sensing system of claim 11, wherein the measuring unit measures current flowing through the self-heating region, and the resistance is calculated based on the voltage supplied to the gas sensing device.

13. The gas sensing system of claim 10, wherein the measuring unit measures voltage between two ends of the self-heating region, and the resistance is calculated based on the current supplied to the gas sensing device.

14. The gas sensing system of claim 10, wherein the feedback unit compares a power corresponding to the resistance with a predetermined power corresponding to the predetermined temperature to calculate the change in power.

15. The gas sensing system of claim 9, wherein the power source supplies the voltage to the gas sensing device by a pulse width modulation or an alternating current.

16. The gas sensing system of claim 9, wherein the predetermined temperature is determined based on the target gas and the sensing material.

17. The gas sensing system of claim 9, wherein the change in resistance causes a change in temperature of the self-heating region, and the control unit controls the change in supply of current or voltage to the gas sensing device to compensate for the change in temperature of the self-heating region.

* * * * *